United States Patent [19]

Bonvallat et al.

[11] Patent Number: 5,537,456
[45] Date of Patent: Jul. 16, 1996

[54] TERMINAL DEVICE FOR SUBSCRIBER TELEPHONE INTERCONNECTION

[75] Inventors: Pierre Bonvallat; Xavier Fasce, both of Cluses, France

[73] Assignee: Pouyet International, France

[21] Appl. No.: 262,265

[22] Filed: Jun. 20, 1994

[30]    Foreign Application Priority Data

Jul. 7, 1993 [FR] France .................... 93 08584

[51] Int. Cl.⁶ .................. H04M 1/24; H04M 1/00
[52] U.S. Cl. .......................... 379/27; 379/399
[58] Field of Search ................ 379/27, 332, 399; 439/630, 676

[56]          References Cited

U.S. PATENT DOCUMENTS

| | | | |
|---|---|---|---|
| 4,460,103 | 7/1984 | Rama et al. ............. | 220/254 |
| 4,488,011 | 12/1984 | Rogers .................... | 379/27 |
| 4,562,311 | 12/1985 | Dola ....................... | 379/27 |
| 4,767,354 | 8/1988 | Saligny ................... | 439/413 |
| 4,910,770 | 3/1990 | Collins et al. ........... | 379/399 |
| 5,178,554 | 1/1993 | Siemon et al. ........... | 439/188 |
| 5,228,872 | 7/1993 | Liu ......................... | 439/607 |
| 5,355,408 | 10/1994 | Lanquist et al. .......... | 379/397 |
| 5,367,569 | 11/1994 | Roach et al. ............. | 379/412 |

FOREIGN PATENT DOCUMENTS

| | | | |
|---|---|---|---|
| 0127349 | 12/1984 | European Pat. Off. ...... | H01R 29/00 |
| WO92/04794 | 3/1992 | WIPO ..................... | H04M 3/30 |

*Primary Examiner*—Stephen Chin
*Assistant Examiner*—Kevin Kim
*Attorney, Agent, or Firm*—Parkhurst, Wendel & Burr

[57]          ABSTRACT

This invention relates to a terminal interface for interconnection of one or more subscriber telephone lines. The interconnections are made, in the interface box, by non-wire connections such as a bus composed of parallel and longitudinal blades or a cut-out circuit. The compartment for the Distributor receives a module for rapid interconnection of telephone lines, and preferably, a protective module and an R-C module. The connections for the Subscriber comprise, in addition to another rapid interconnection module, a telephone test socket which is associated with electro-mechanical means which electrically insulate the Subscriber's line from the incoming line as soon as it is desired to plug into this socket a conjugate telephone plug.

18 Claims, 23 Drawing Sheets

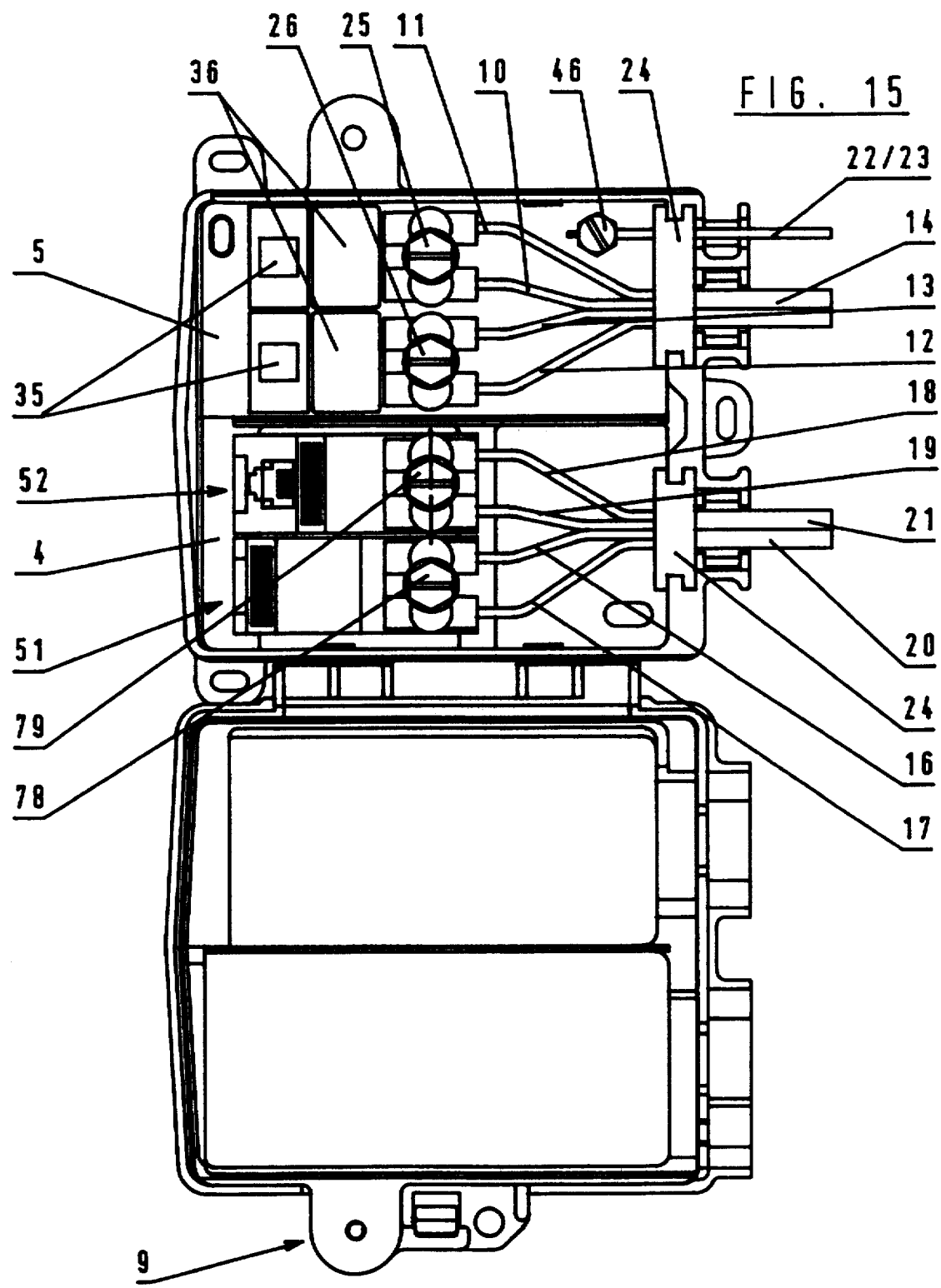

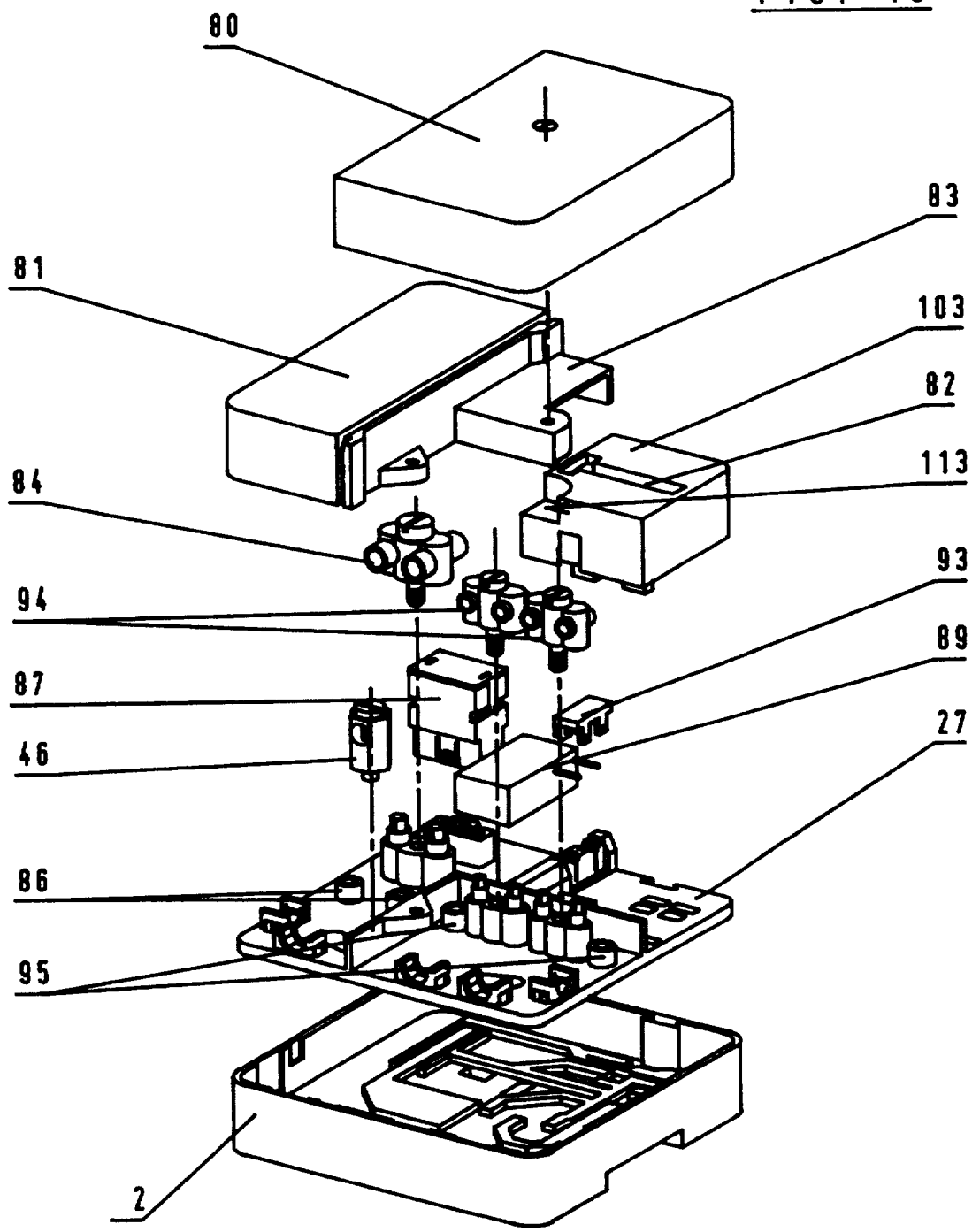

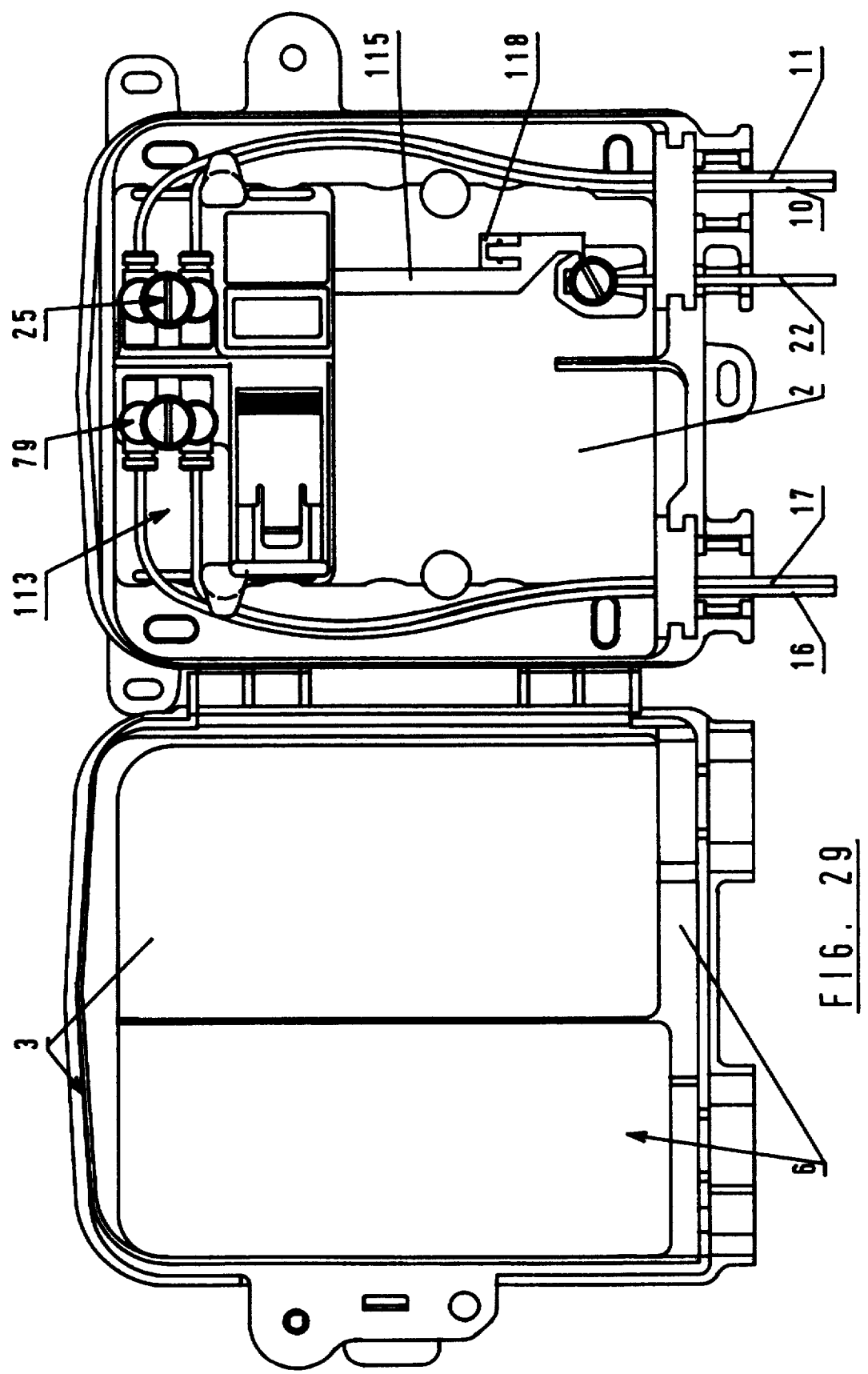

TERMINAL DEVICE FOR SUBSCRIBER TELEPHONE INTERCONNECTION

BACKGROUND OF THE INVENTION

1. Field of the Invention

The present invention relates to a terminal device for subscriber telephone interconnection.

Such a device is normally in the form of a box which may be disposed out-of-doors, and therefore subjected to bad weather. Its purpose is to connect the telephone line to one or more subscribers.

2. Related Art

At the present time, boxes of this type exist, particularly in the United States of America, called "Network Interface Devices", which have already come under particular study in that they comprise, in one and the same box, two clearly separate compartments:

a first compartment which is directly accessible when the cover of the box is opened, and which contains the connections for the installation of the subscriber, or subscribers if there is more than one subscriber telephone line connected by this box;

a second compartment which is accessible only if a second cover, generally closed by lead-seal, is opened and which contains the connections for the operator, i.e., the public or private Administration charged with telephonic distribution.

On the subscriber connection side, these modern devices generally use, in addition, a test socket, generally of the "modular jack" type which is placed upstream of the two terminals for connection to the box of the line of the subscriber's installation, and electrically in series therewith.

This test socket is composed, on the one hand, of a female "modular jack" base which is directly connected on the incoming line, at the outlet of the compartment reserved for said Administration, and, on the other hand, of a complementary male socket or plug, also of the "modular jack" type, which is provided at the end of a portion of twin-wire cable, of which the other end is connected to the said two terminals for connection to the interface box of the two wires of the line of the subscriber's private installation. If this male plug is introduced in this female base, continuity of connection is ensured, and this private installation is supplied. It is no longer so if this male plug is withdrawn, but, on the other hand, the subscriber may, in order to test correct functioning of the installation of said Administration in the event of breakdown, directly connect his terminal or telephone set (which is also equipped with a "modular jack" plug) on this female base. If his telephone set then functions normally, the breakdown does not come from the Administration's installation, but from his private installation.

In this type of interconnection box, all the connections are wire connections which present the drawbacks of being long and impractical to install, as well as of being subject to corrosion.

Furthermore, as all the connections are effected by screwing on bared ends of connecting wires, it is easy for a fraud to connect on the line of a subscriber without his noticing, by using such connecting screws. It is also possible to defraud in the same way by using an adaptation with multiple outputs for "modular jack" socket.

SUMMARY OF THE INVENTION

It is an object of the present invention to overcome these drawbacks of the devices known and described hereinabove, but nonetheless present all the advantages thereof.

To that end, the invention relates to a terminal device for telephone interconnection of at least one subscriber, which is in the form of a box divided into two clearly distinct compartments, viz. a first compartment which contains the connections for the Administration or private enterprise charged with telephone distribution and which is generally not accessible to the subscriber, and a second compartment which is accessible to the subscriber and which therefore contains the connections for his private telephone line or lines which are connected to the corresponding line or lines of the Administration or Enterprise via this terminal interconnection device, this second compartment containing, for each line, a test socket composed of a telephone socket connected directly on the line of the Administration or Enterprise and at the output of said first compartment reserved therefor, this socket being adapted to receive, in order to test correct functioning of the Administration's or Enterprise's installation, the conjugate socket which normally equips a subscriber terminal or telephone set, the device being characterized in that:

in this box, the electrical interconnections are not made by wire connections, but by non-wire connecting means such as metal blades or cut-out metal circuits, and, in the second compartment of this box, the telephone socket is associated with electro-mechanical means, which, when the conjugate socket of a terminal or telephone set is naturally connected in this socket, then bring about automatic cut-off of the electrical connection which existed between this socket and the corresponding private line of the subscriber.

BRIEF DESCRIPTION OF THE DRAWINGS

The invention will be readily understood and its advantages and other characteristics will appear from the following description of some non-limiting embodiments of this terminal device for telephone interconnection for one or more subscribers, with reference to the accompanying schematic drawings, in which:

FIG. 9 shows this box according to FIG. 8 in the same way, with the two covers removed and its plug-in module for protection against overvoltages as well as its R-C module not yet plugged in.

FIG. 15 is a view similar to FIG. 12, showing this same box with its two covers, "principal" and "telephone distribution side", both open.

FIG. 16 is an exploded view in perspective of a more universal variant embodiment of the terminal box of FIG. 10.

FIG. 29 is a plan view of the interconnection terminal according to FIG. 27, with the incoming and outgoing wire connections made.

DETAILED DESCRIPTION OF PREFERRED EMBODIMENTS

Figure 1:
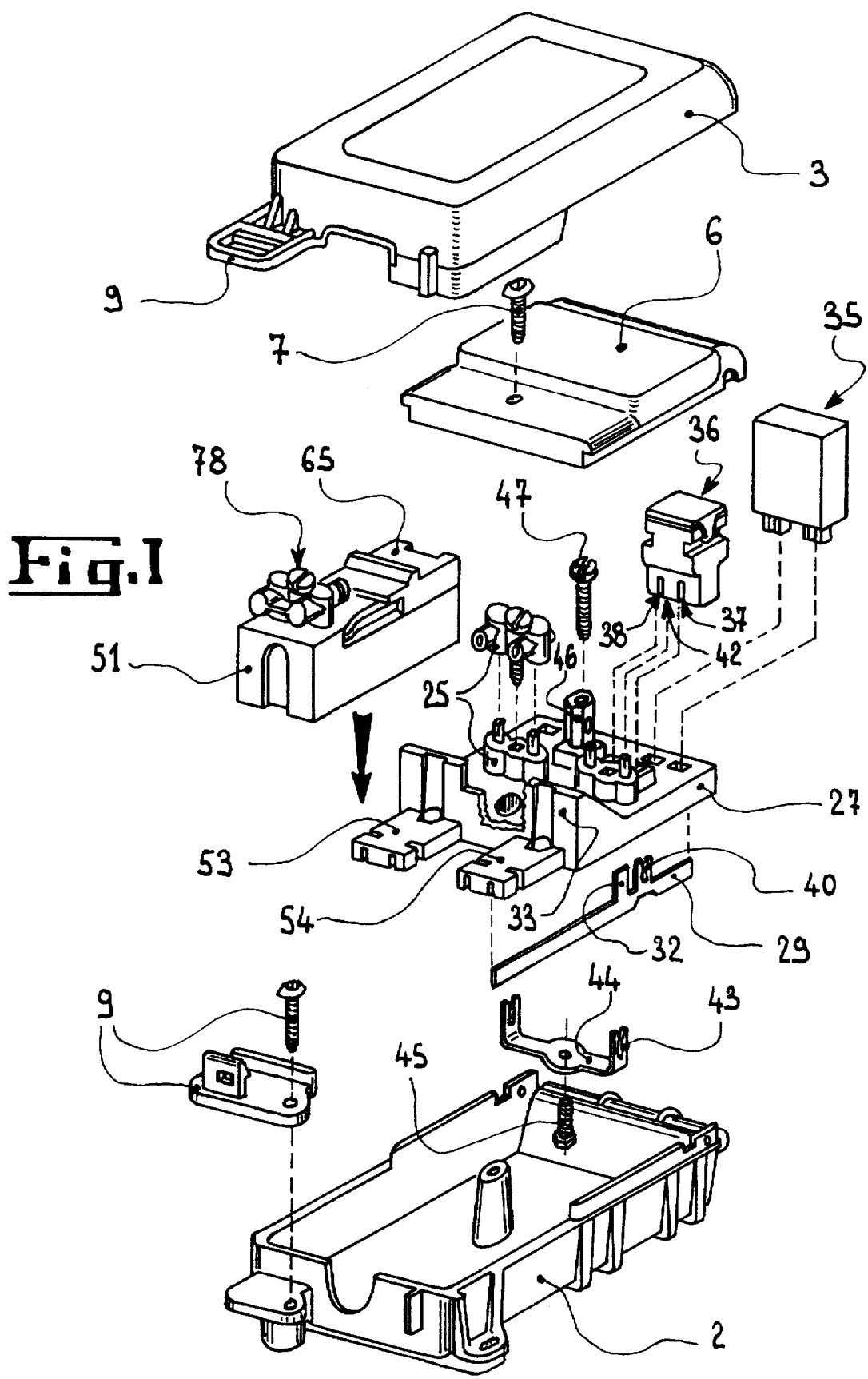
FIG. 1 is an exploded partial view in perspective of a first embodiment of this terminal box for subscriber telephone interconnection.
Figure 2:
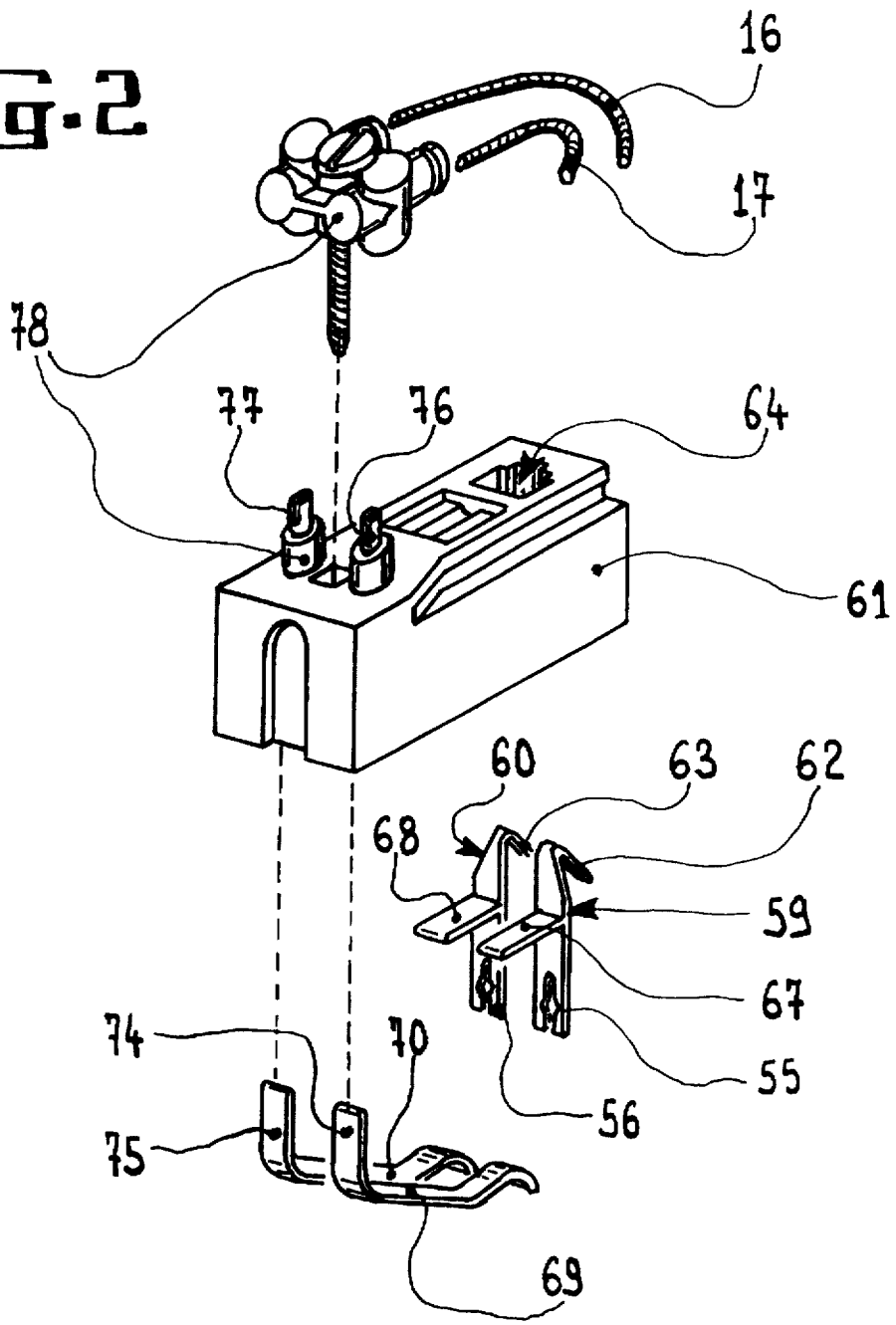
FIG. 2 is an exploded view in perspective of one of the two specific subscriber modules which equip the interconnection terminal of FIG. 1.

Referring now to the drawings, and firstly to FIGS. 1 to 7, they show a first embodiment of a telephone interconnection terminal device which, in this example, may ensure interconnection of two subscriber lines on two corresponding lines of the general telephone network.

An interconnection terminal of this type is very generally in the form of a box 1 of plastic material which is intended to be positioned on a wall, either inside or outside a building, dwelling house, offices or other premises.

In the present case, it is made,of two half-shells, viz. a bottom half-shell 2 and a conjugate principal cover 3 which closes on this bottom 2 in virtually weatherproof manner.

The inner part of the box 1 is divided, which is not novel per se, into two distinct compartments, viz. (cf. for example FIGS. 3 and 7), a first compartment 4 which is directly accessible when the principal cover 3 is opened and which contains all the interconnection connections for the two subscribers, and a second compartment 5 which is accessible only when a secondary closure cover 6, employing screws and generally with lead-seal, is opened, and which contains all the connections for the Administration or Enterprise charged with telephone distribution and which will be referred to here as "Distributor", as opposed to the consumers, or "Subscribers".

In this embodiment, the principal cover 3 and the secondary cover 6 are mounted to rotate on a common axis 8. The first closes by clip-on closure means 9 and the second by the lead-sealed screw 7 mentioned above. Other forms of embodiment of these covers exist, as will be seen hereinafter, all this being conventional per se, contrary to what follows.

According to a first aspect of the invention, this interconnection terminal comprises no internal wire connection, the only wires that it contains being (FIG. 7), on the one hand, the four end wires 10, 11 and 12, 13 of the respective two incoming lines 14 and 15 and, on the other hand, the four end wires 16, 17 and 18, 19 of the respective two outgoing lines 20 and 21 towards the two subscribers, as well, moreover, as the two respective earth wires 22 and 23, all these wires being introduced into the box through a rubber passage 24.

In compartment 5, the two incoming lines 14 and 15, which therefore come from the distributor, are connected as shown to a respective module 25 and 26 for rapid interconnection of telephone lines with control screws and self-stripping connection slots. Each of these modules is a module of the type now largely distributed and sold by the Applicant company under reference "MX" which is virtually identical to that described in U.S. Pat. No. 4,767,354 and in particular shown, under reference 1, in FIGS. 1, 3, 4 and 6 of this U.S. Patent. However, it is screwed in a base 27 of plastics material which serves as support for all the elements placed in the box 1, and which is rendered fast with the bottom 2. In addition, it does not comprise orifices for introduction, for the purpose of connection by the slit lower end of each of its two tubular metal contacts 28 with upper and lower self-stripping slits, of a second pair of wires. On the other hand, this lower slit part of the tubular contact 28 is solidly fitted on the edge of a respective longitudinal metal blade 30, 29 (FIGS. 3 and 1) which is imprisoned in the body of the base 27 and which comprises to that end a small conjugate prominent part 31, 32.

It should be noted that the two contacts 28 are not necessarily tubular contacts, but flat contacts with upper self-stripping slit as well, preferably, as with lower self-stripping slit, which is then fitted on the edge of the corresponding longitudinal metal blade 29 or 30.

The two longitudinal metal blades 29 and 30 are parallel and each located in a vertical longitudinal plane. To some extent, they form a metal "bus" which ensures the electrical interconnection in parallel of all the elements of the box 1 which concern the same telephone line. In the present case, there are two telephone lines, and therefore two respective pairs of blades 29, 30 and 57, 58 and consequently two "busses".

The insulating wall 33 which defines the separation between the two compartments 4 and 5 is an integral part of the base 27.

On the interconnection bus 29, 30, there are also plugged, in the compartment 5 for the Distributor, a module 36 for protection against overvoltages and a module 35 intended for remote line tests, called "R-C module".

The protective module 36, which contains a three-pole overvoltage arrester 34, is a conventional plug-in protective module and more precisely a module such as described in French Patent Application No. 93 05049 and marketed by Applicants under reference "MXP".

Its two line plugs 37, 38 are fitted in two conjugate "tuning-fork" contacts 40, 41 which are themselves formed by a respective protuberance of the respective receiving blade 29 and 30. Its median earth plug 42 fits in a conjugate tuning fork contact 43 which is formed (FIG. 1) by one of the two ends, raised to the vertical, of a metal earth blade 44, transverse and included in the horizontal plane.

The transverse blade 44 is fixed beneath the base 27 by a median metal screw 45 of which the end penetrates in a median metal contact 46 which receives the said earth wires 22 and 23. The stripped ends of these two earth wires are clamped in the contact 46 by means of a screw 47 (cf. in particular FIG. 6).

Figure 5:
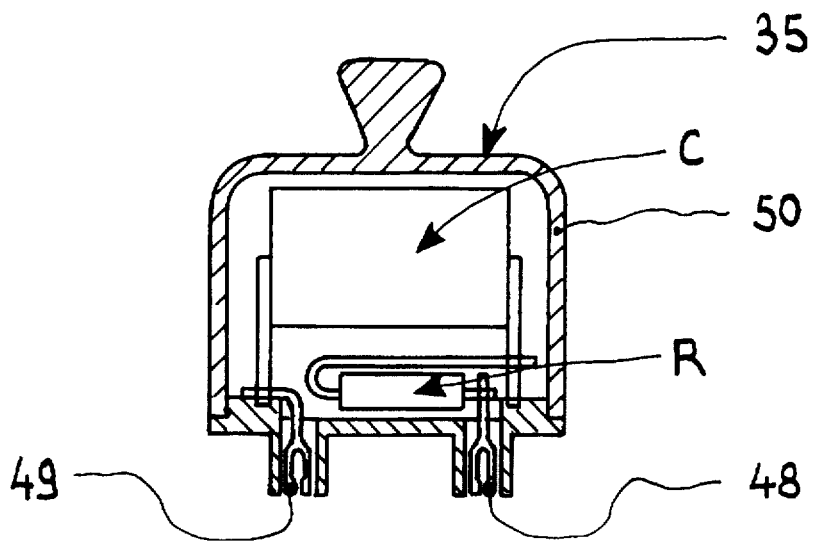
FIG. 5 is a view in section of one of the two plug-in R-C modules which equip this same interconnection box.

The R-C module 35 is shown in detail in FIG. 5. It is directly fitted on the two blades 29 and 30 by means of two conjugate tuning fork contacts 48 and 49. It comprises, in its plastic envelope 50, a capacitor C and a resistor R which are connected in series as shown between the two line wires. This R-C module makes it possible to effect frequency tests of the line from the auto-switch of the distributor, and therefore at a distance.

Figure 3:
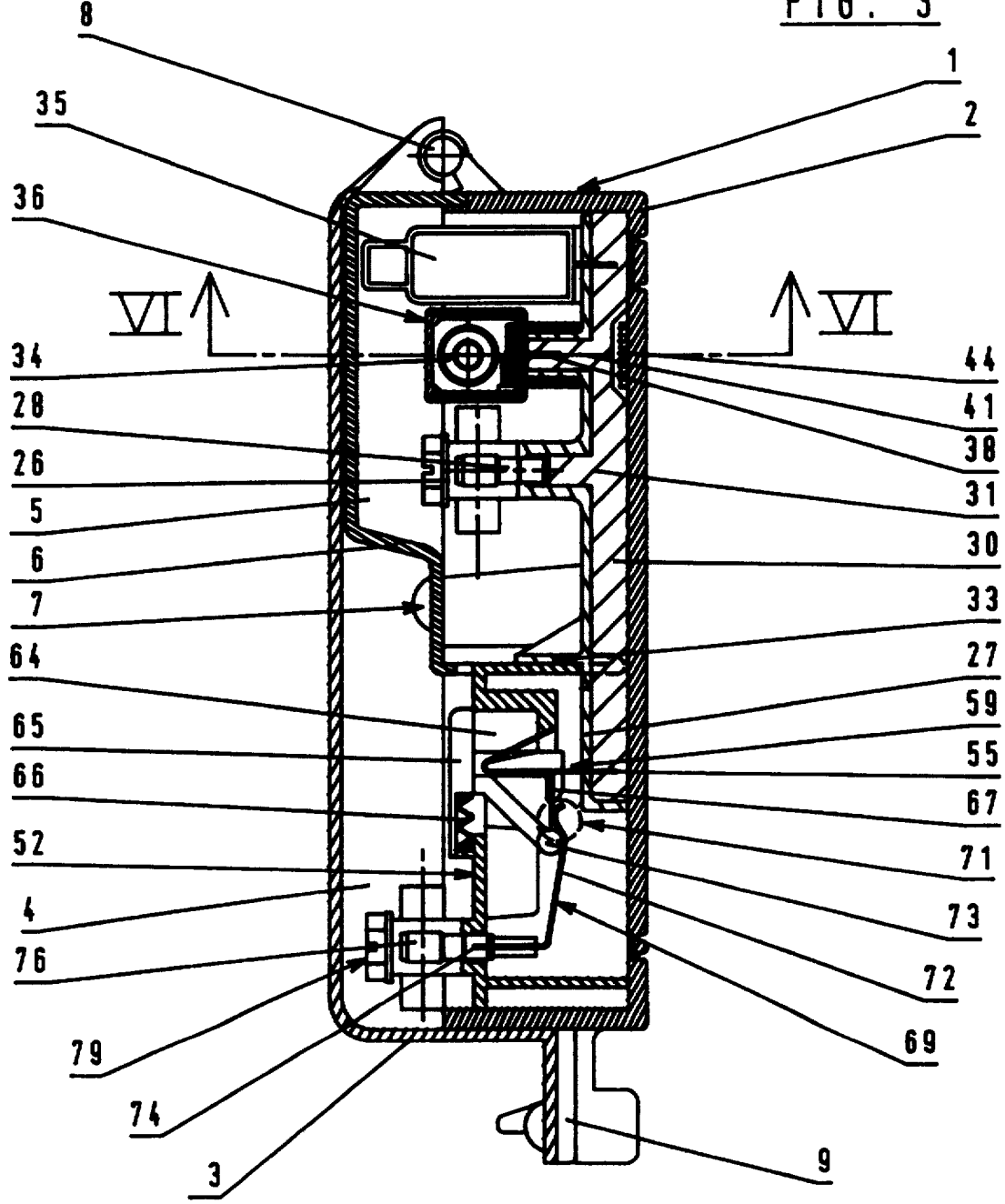
FIG. 3 is a partial longitudinal section of the interconnection terminal of FIG. 1, with the flap for closure of its test socket closed.

As shown in FIG. 3, the two pairs of blades 29, 30 or "interconnection bus" do not extend only along the compartment 5, but extend up to and into compartment 4 which concerns the connections for the two subscribers.

In this compartment 4, connection between each bus 58, 57-29, 30 and the stripped ends of the respective two corresponding line wires, 16 and 17 for a first line 20 towards a first subscriber, and 18, 19 for the second line 21 towards the other subscriber, is effected in each case by means of a very particular module 51, 52 (cf. FIGS. 1 to 7), which is fitted by clipping on one of the two ends 53, 54 of the base 27 which occupy compartment 4. One of these two modules is shown in exploded view in FIG. 2.

Figure 6:
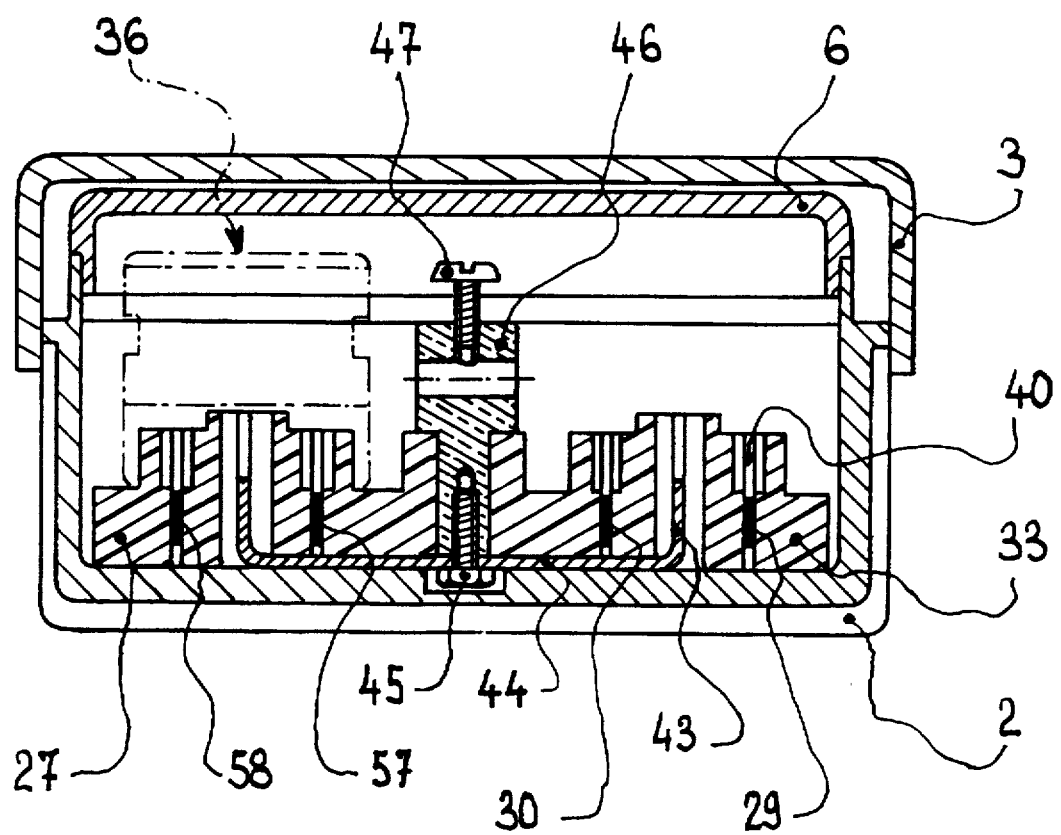
FIG. 6 is a transverse section of this interconnection box along VI—VI of FIG. 3.
Figure 7:
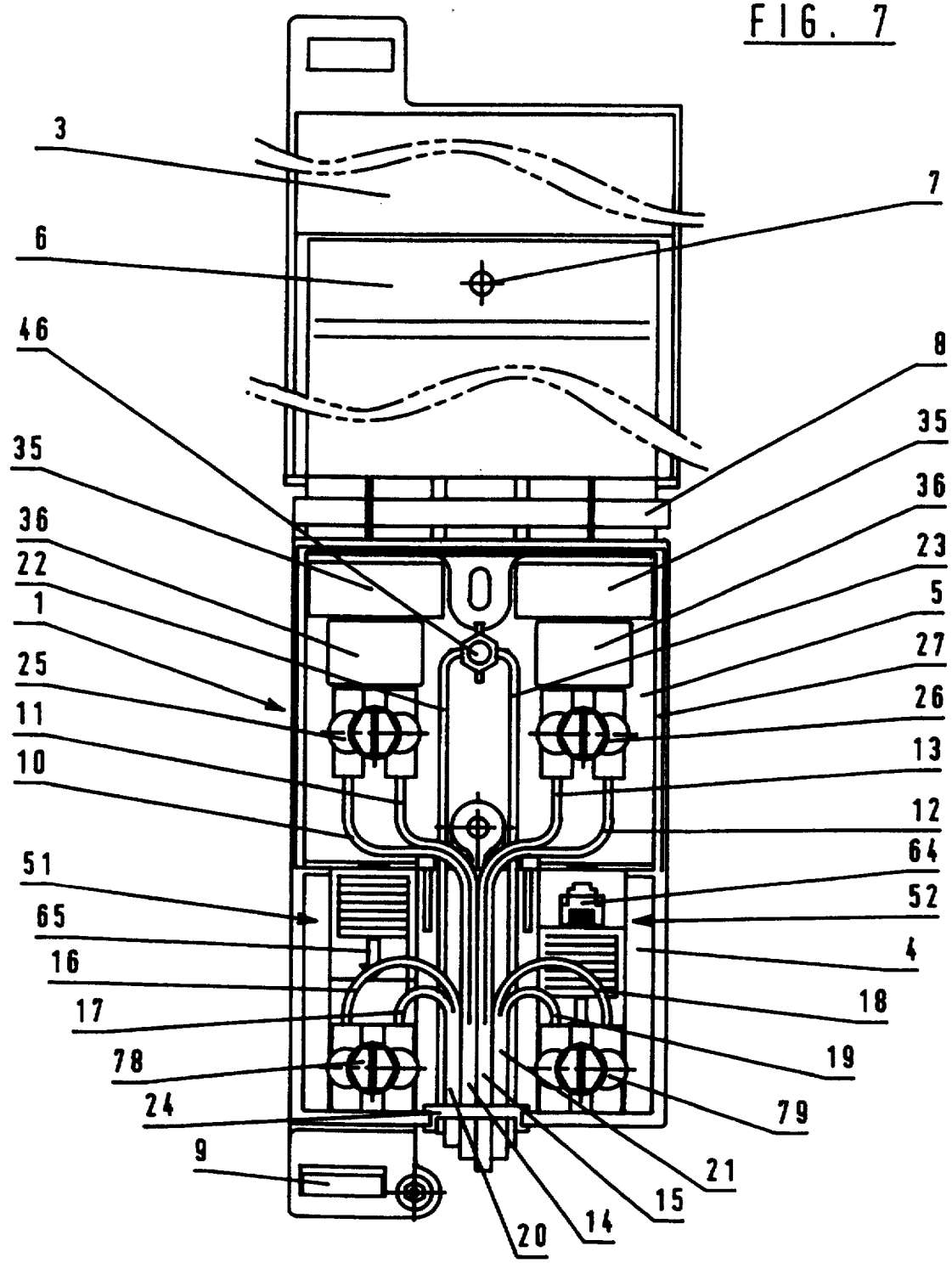
FIG. 7 is a top view of this same interconnection box, with its two covers open and the wires of the incoming and outgoing lines connected.
Figure 8:
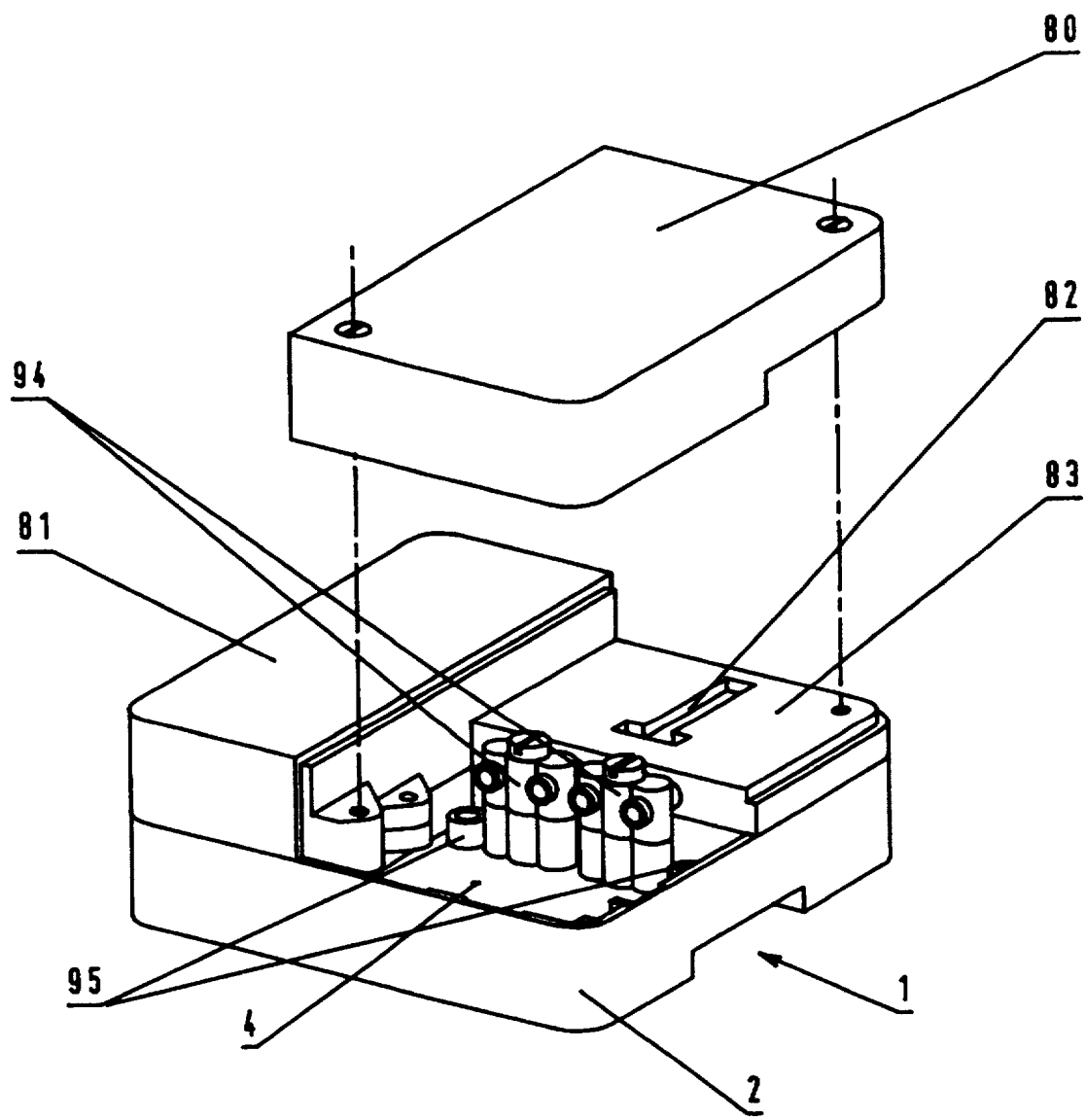
FIG. 8 is an overall view in perspective of a second embodiment of this terminal box for subscriber telephone interconnection, with only the cover on the "subscriber side" removed.
Figure 9:
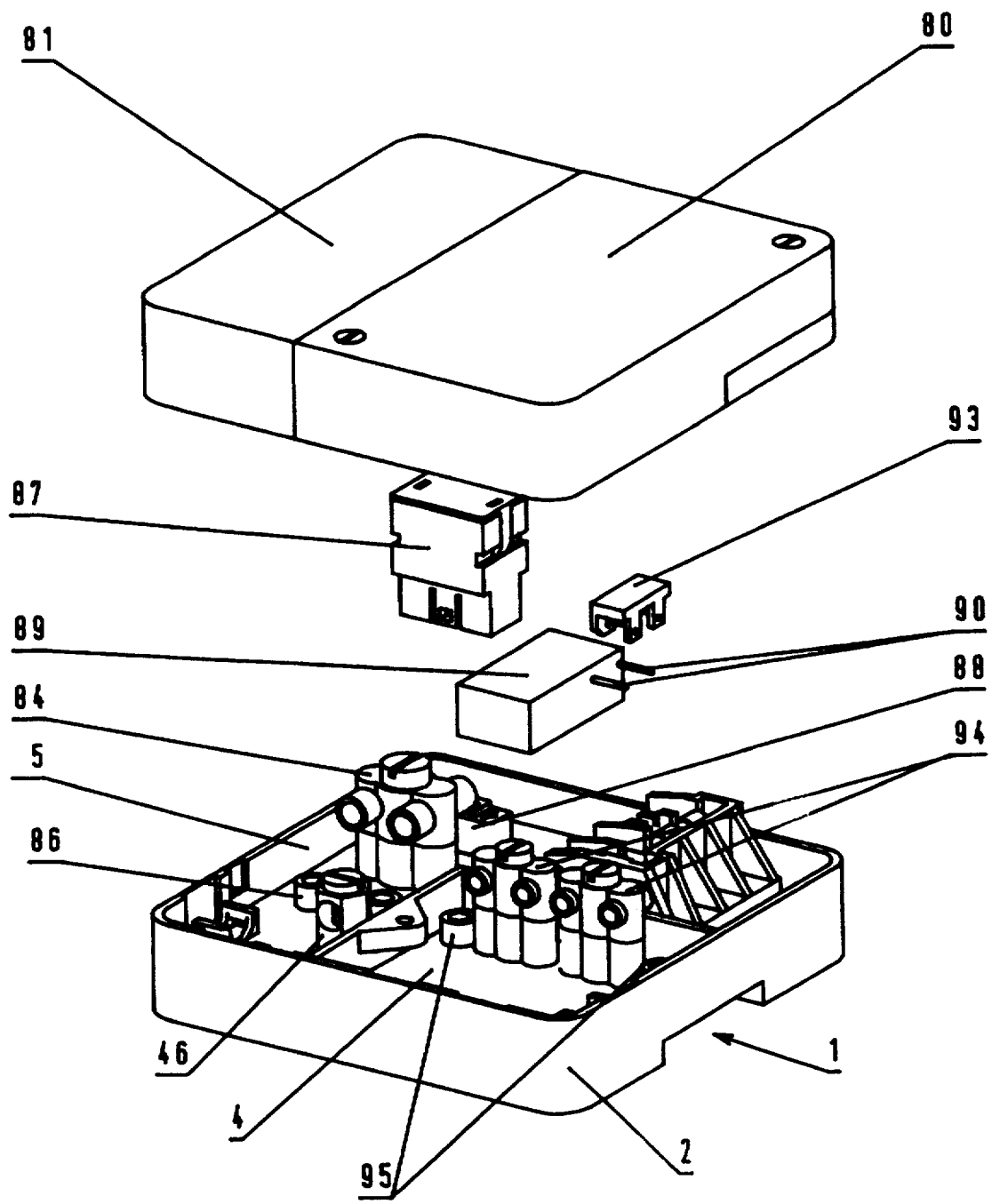

When one of these two modules, for example module 51, is placed in position on the corresponding end 53 of the base 27, and two tuning fork contacts 55, 56 placed beneath this module mount the corresponding line bus, such as bus 57, 58 or bus 29, 30 visible in FIG. 6, depending on the case.

The two tuning fork contacts 55, 56 constitute the lower ends of two more complex metal contacts 59 and 60 (FIGS. 2 and 3) which are captive of the plastic body 61 of the module 51.

In their upper part, these vertical contacts are each folded downwardly and towards compartment 5 to form two fine elastic plates 62 and 63 which constitute the two conventional line contacts of a female socket 64 of "modular jack" type which equips half the upper part of the module 51 which is the closest to compartment 5.

This socket 64 is therefore normally permanently connected to the two terminals 29, 30 or 57, 58 of the incoming line. The subscriber may connect thereto his own telephone set in order to test the correct functioning of the circuits placed upstream, i.e. correct functioning of the Distributor's circuits placed upstream of his private installation.

This socket 64 is normally concealed by a sliding cover 65 which is returned into position of closure (FIG. 3) by a return spring 66.

As will now be seen, this cover or flap 65 performs an essential role, as the fact of opening it by pulling it under the action of spring 66 automatically disconnects the subscriber's circuits.

The metal contacts 59, 60 each present a horizontal tab 67, 68 directed towards the subscriber.

The free end of this tab cooperates with the conjugate one of a supple blade 69, 70 to form a switch such as switch 71 (FIG. 3). As is clearly seen in FIG. 3, the median part of each blade forms a ramp 72 which descends in an easy slope towards the right. In position of closure of flap 65, a tab 73 fast with said flap approaches, without bearing on, the free end of the ramp 72 thus allowing electrical contact between blades 69 and 67 of the switch 71.

Figure 4:
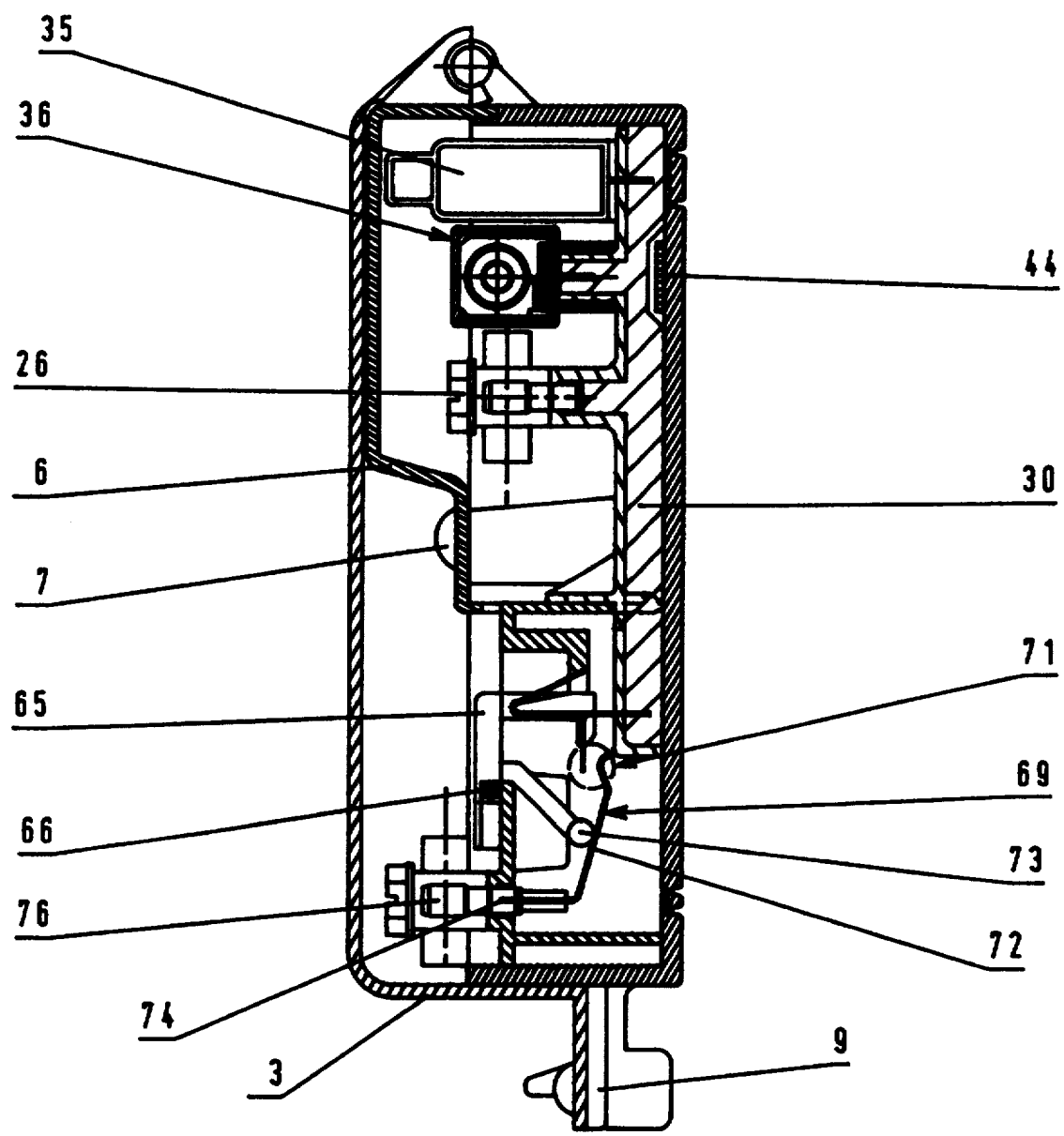
FIG. 4 is a view similar to FIG. 3, with this same flap open.

When, as shown in FIG. 4, the flap 65 is opened by pushing it back against the force of the spring 66 in order to disengage the input of the modular jack socket 64, the free end of the tab 73 pushes the supple blade 69 downwardly, which brings about opening of the switch 71, thus insulating this modular jack socket from the remaining part of the subscriber's installation.

At their end opposite the switch 71, each of the blades 69 and 70 is folded vertically and upwardly to form vertical contacts 74 and 75.

On these two contacts are fitted the two lower self-stripping slits of the two tubular contacts 76 and 77 of another module 78, 79 for rapid interconnection of telephone lines, which is identical to module 25 or 26 mentioned above.

Module 78 receives the subscriber wires 16 and 17 and module 79 receives the subscriber wires 18 and 19.

Finally, it is ascertained that, on the one hand, all the interconnections inside the box are effected without wire connections and that, on the other hand, the fact of disengaging the flap 65, to allow access to a modular jack socket 64 in order to effect a test of correct functioning of the Distributor's lead-sealed part 5, oneself, totally insulates the subscriber's private installation of the corresponding telephone line which arrives in this box. A malevolent third party could not possibly connect, in compartment 4, on the subscriber's line without the subscriber noticing.

Another embodiment of this subscriber telephone interconnection terminal box will now be described with reference to FIGS. 8 to 11, to which reference will now be made. The device shown is provided to connect one subscriber only, instead of two as in the preceding example, and a French contactor replaces the previous modular-jack socket.

In this example, the bottom 2 of the box 1, which is divided into the same two distinct compartments 4 and 5, is closed by two respective adjacent covers 80 and 81, cover 81 being, of course, lead-sealed as it covers the Distributor's compartment 5.

However, compartment 4 receives a French contactor 82, instead of the previous modular jack socket 64, and cover 83 of this contactor 82 forms part of cover 81 and is therefore lead-sealed likewise.

Compartment 5 contains, like the preceding box, a module 84 for rapid interconnection of telephone lines, as well as an earth terminal 46. There is further provided, as in compartment 4, on each line wire, two conventional test sockets 86–95 each adapted to receive a complementary banana plug.

A protective module 87, identical to module 36 mentioned above, may in addition be fitted in this compartment 5 on tuning fork receiver contacts 88.

A conventional R-C circuit 89, normally covered by the lead-sealed cap 83, is plugged, by its two small connecting tabs 90, in two corresponding self-stripping connection slits 91 (FIG. 11) which are integral with the two elastic line connection blades 92 of the contactor 82.

A conventional connection pusher 93 makes it possible to plug the two tabs 90 of the R-C circuit 89 in the slits 91, without twisting them.

Compartment 4, for the subscriber's connections, contains in this example two rapid interconnection modules 94 which make it possible easily to have, for example, two telephone sets connected in parallel on the same line. The line of the subscriber may very well be connected only on one of these modules 94. This compartment also contains two test sockets 95, identical to sockets 86.

This box has the same functions as the previous box. It effects, on the one hand, all the connections without internal wire connections, and, on the other hand, the introduction of a French telephone plug in the conjugate contactor 82 automatically insulates the subscriber's private installation with respect to the incoming telephone line, as hereinbefore.

Figure 10:
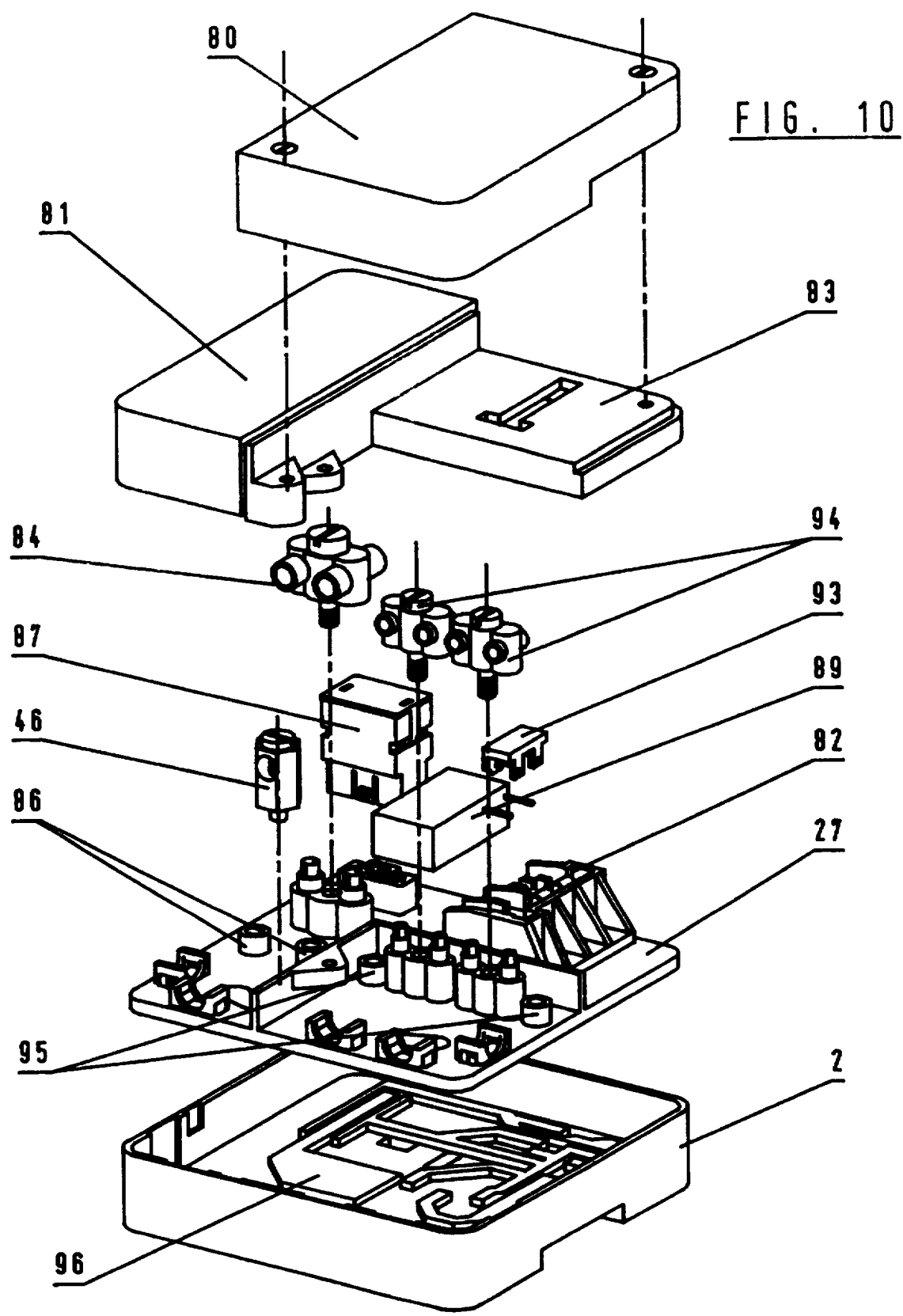
FIG. 10 is an exploded view in perspective of the terminal interconnection box according to FIGS. 8 and 9.

The means used here for ensuring this double functionality will be explained with reference to FIGS. 10 and 11.

As before, all the connections inside the box are borne by a removable plastic base or plate. The interconnection links are here ensured by a conventional cut-out circuit 97 which is housed beneath plate 27. In a variant embodiment, this plate may be moulded on this cut-out circuit. A support circuit 96, made of plastic material, is integrated in the bottom 2 of the box. It gives firm support to the cut-out circuit 97.

Figure 11:
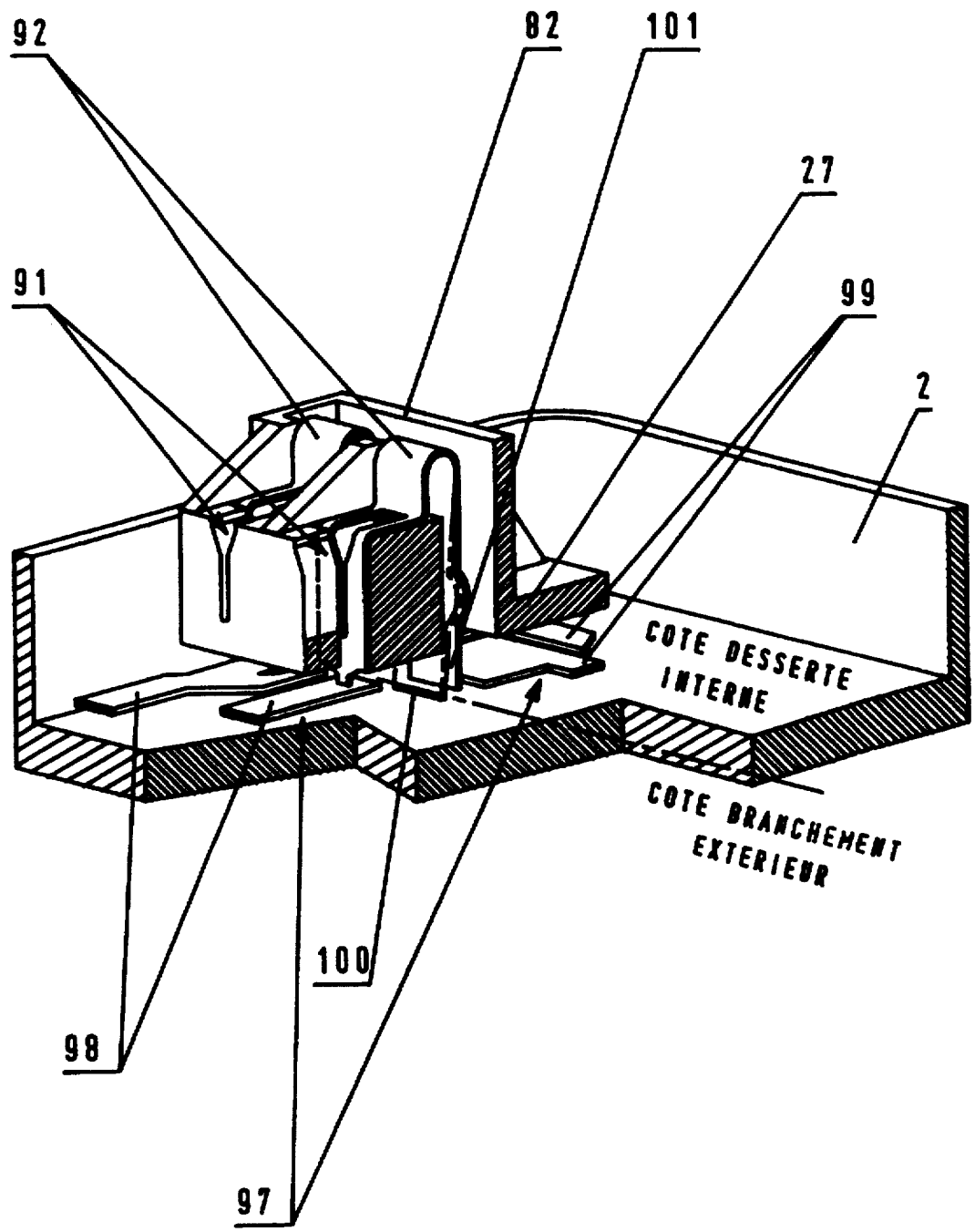
FIG. 11 is a view in detail of the interconnection terminal of FIGS. 8 to 10, showing how the insertion of a telephone socket in its contactor brings about disconnection of the line on the subscriber side.
Figure 12:
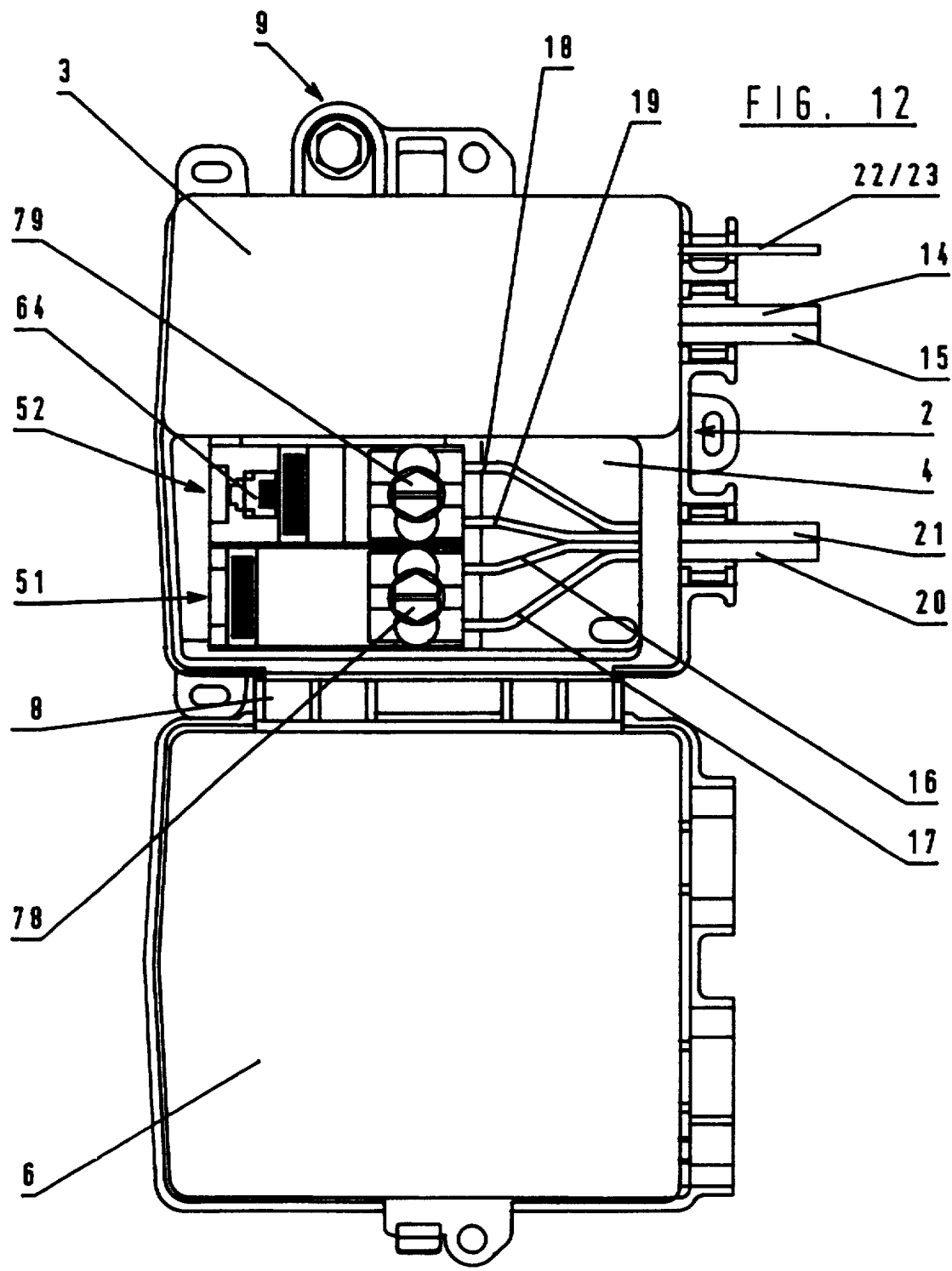
FIG. 12 is a top view, similar to FIG. 7, of a third embodiment of this interconnection box, with solely its principal cover open.

As shown in FIG. 11, the two elastic blades 92 are each crimped on a respective flat line connection 98, which is connected to the "Distributor" side or "outer connection side". On the other hand, the two flat line connections 99 on the "Subscriber" side or "inner service side", are respectively connected to the free ends 100, inside the socket 82, of the two small elastic plates 92 of this contactor 82 by a simple elastic bearing contact 101.

As indicated in dashed-and-dotted lines in FIG. 11, the introduction of a conjugate male socket in the contactor 82 causes the free end 100 to recoil, which cuts the contact thereof with the conjugate end 101 of the inner service or subscriber service line 99, in non-wire cut-out circuit.

Of course, it should be noted that the contactor 82 may be replaced by a modular jack socket with closure flap functioning as hereinbefore (FIGS. 3 and 4).

Another embodiment, inter alia, is illustrated in FIGS. 12 to 15.

Figure 14:
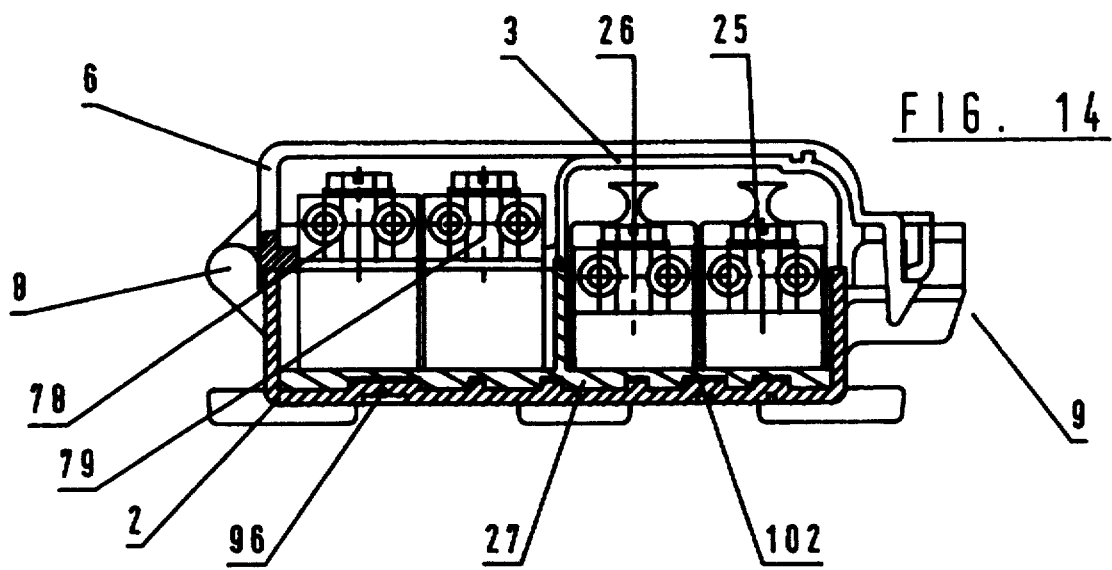
FIG. 14 is a partial transverse section thereof along XIV—XIV of FIG. 13.

This device essentially differs from the one of FIGS. 1 to 7 by the fact that the compartments 5 (distribution) and 4 (subscriber) are placed side by side and not one behind the other. Consequently, as shown in FIG. 14, the interconnection links inside the box are effected, like the device of FIG. 10, by a cut-out circuit 102 applied beneath the base 27 and supported by a plastic circuit 96.

Otherwise this circuit incorporates the elements described hereinabove, which will therefore not be described again here, but simply designated by the same reference figures.

Figure 17:
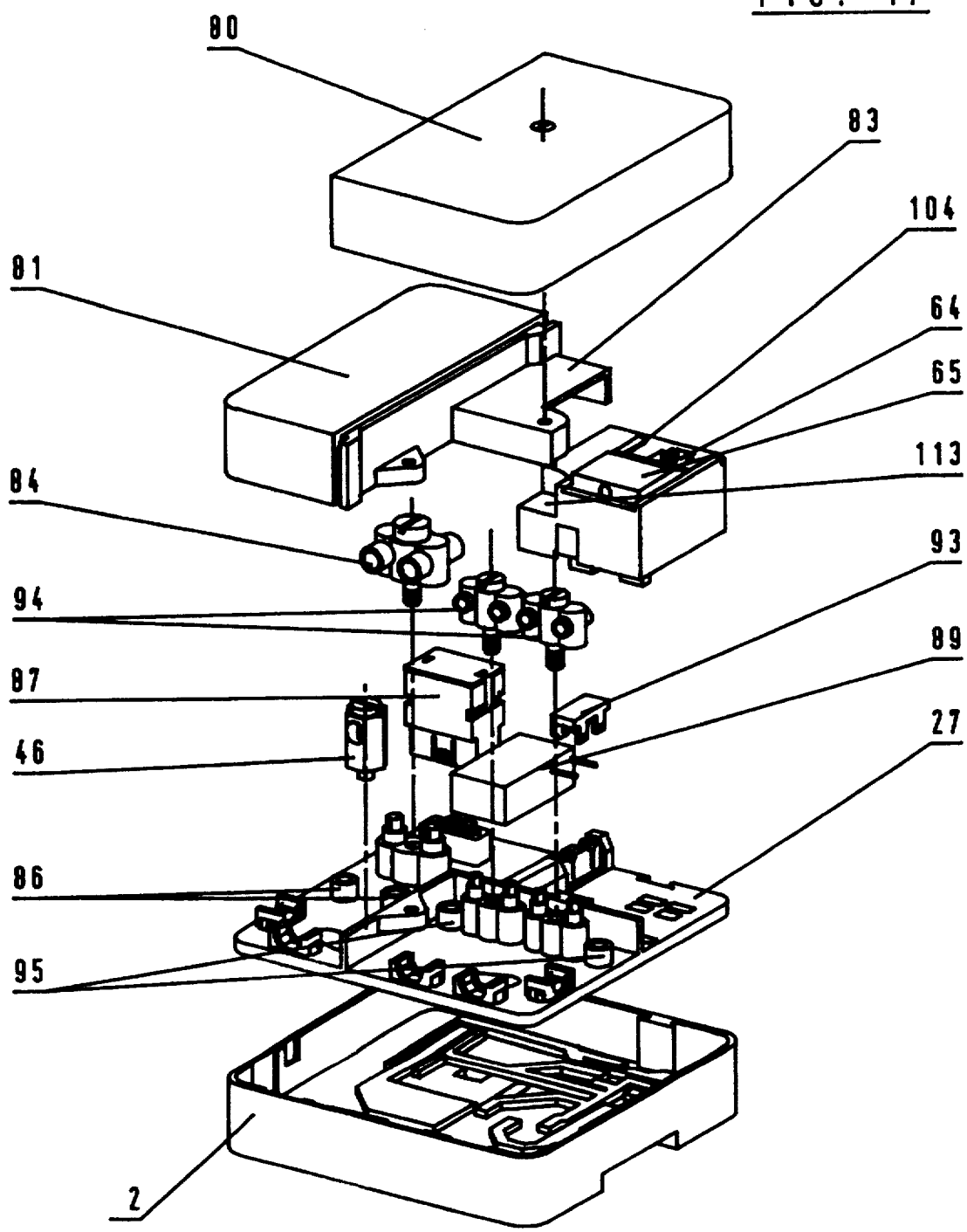
FIG. 17 shows the terminal box of FIG. 16, but ready to be equipped with a subscriber module with "modular jack" socket and not with a subscriber module with French contactor.

Referring now to FIGS. 16 and 17 and firstly to FIG. 16, the latter (which should be compared with FIG. 10 of which it takes up the majority of the elements, consequently designated by the same reference figures), presents a part 83 of the lead-sealed cover 81 which in fact covers only the R-C circuit 89, and a very localized part 113 of the module 103 of the socket 82 reserving solely for the Distributor the opportunity of extracting the latter.

The contactor 82 itself and its electro-mechanical circuit 100-101 for automatic electrical insulation of the subscriber's line in the event of plug-in of said conjugate telephone plug, is constituted like a module 103 which may be plugged into the plate 27 and which embraces the same functions as those of FIG. 11.

The advantage thereof is that it is then possible, as FIG. 17 schematically shows, to replace the plug-in module 103 with French contactor 82 by another plug-in module 104 which, this time, contains a modular jack socket 64 presenting the same functionalities, with its cut-off flap 65, as those described hereinbefore with reference to FIGS. 3 and 4.

These two modules 103 and 104 are fitted, by tuning fork contacts, on one and the same cut-off circuit consequently provided beneath the plate 27, as will now be explained with reference to FIGS. 18 to 21.

Referring now to these FIGS. 18 to 21, FIGS. 19 and 21 show a part 105 of the cut-out circuit which is housed beneath the plate 27 equipping the boxes according to FIGS. 16 and 17, and more precisely that part of this cut-out circuit, which, depending on the case, lies beneath the modular jack socket 64 of the plug-in module 104 of FIG. 17 or beneath the contactor 82 of the plug-in module 103 of FIG. 16.

Figure 18:
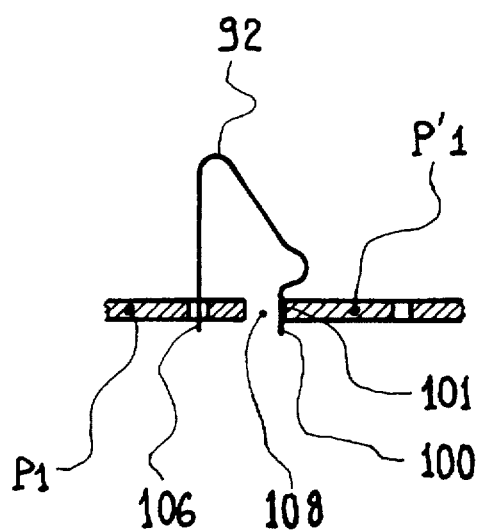
FIGS. 18 and 19 are a view in section and a plan view from underneath, respectively, of the support plate, showing very schematically how the connection of the plug-in contactor equipping the box of FIG. 16 is effected.
Figure 19:
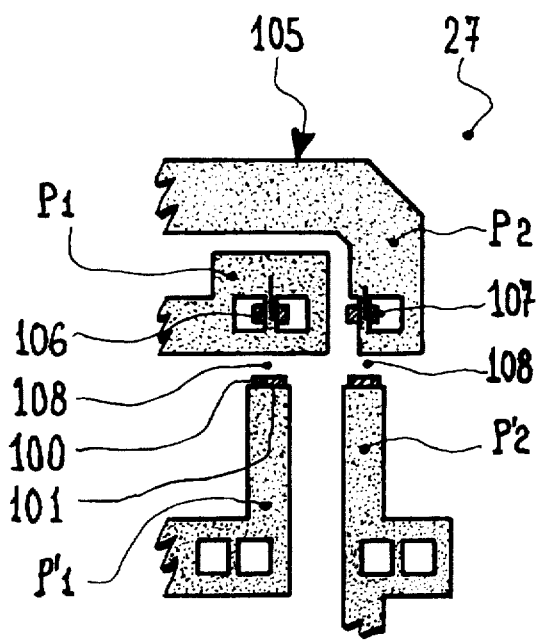
Figure 20:
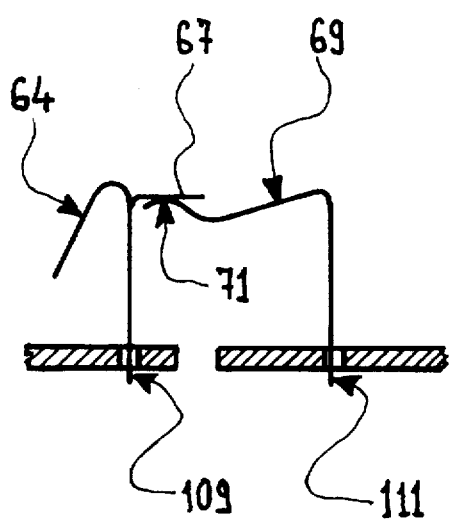
FIGS. 20 and 21 are views similar to FIGS. 18 and 19, but relative to the plug-in modular jack socket equipping the box according to FIG. 17.

As shown in FIGS. 18 and 19, and in comparison to FIG. 11, the elastic contact blades 92 of the contactor 82 each present a tuning fork contact 106, 107 which are both provided to fit respectively on track P1 and on track P2, which both materialize the incoming telephone line (outer connection side). Their other free ends 100 then bear on the ends 101 of the conjugate tracks P'1 and P'2 which materialize the outgoing line (subscriber side) and which are separated from the first, P1 and P2, by an air gap 108.

As explained hereinbefore with reference to FIG. 11, the introduction of a conjugate male plug in the contactor 82 opens the electrical contact 100-101 and therefore insulates the subscriber line P'1, P'2.

Figure 21:
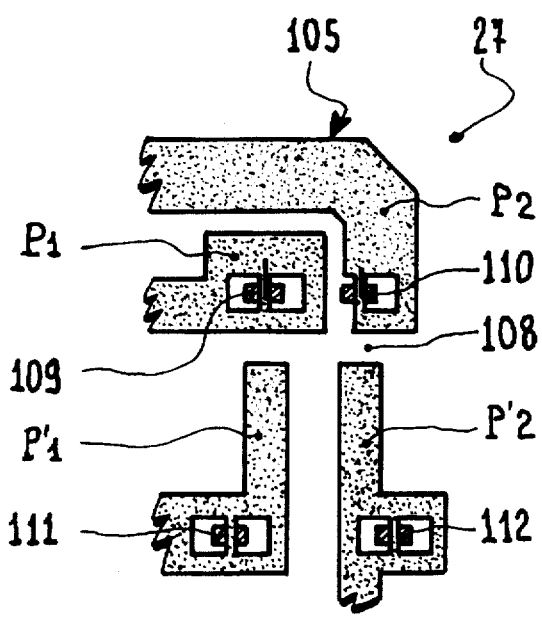

If, according to FIG. 17, module 103 with contactor is replaced by module 104 with modular jack socket 64, this modular jack socket 64 is associated (FIG. 20) with the same cut-out elements 67, 69, 71 as that of FIG. 3. For fitting on tracks P1, P2 on the one hand and P'1, P'2 on the other hand, there are provided on socket 64 and on the two blades 69, two couples of tuning fork contacts 109, 110 and 111, 112 which respectively fit, as shown in FIG. 21, on the couple of tracks P1, P2 and P'1, P'2. The flap 65 according to FIGS. 17 and 3 then opens the switch 71 when it is pushed back to disengage socket 64.

Finally, it is ascertained that one and the same cut-out circuit 105 accepts equally well the plug-in module 103 with French contactor and the plug-in module 104 with modular jack socket.

Figure 13:
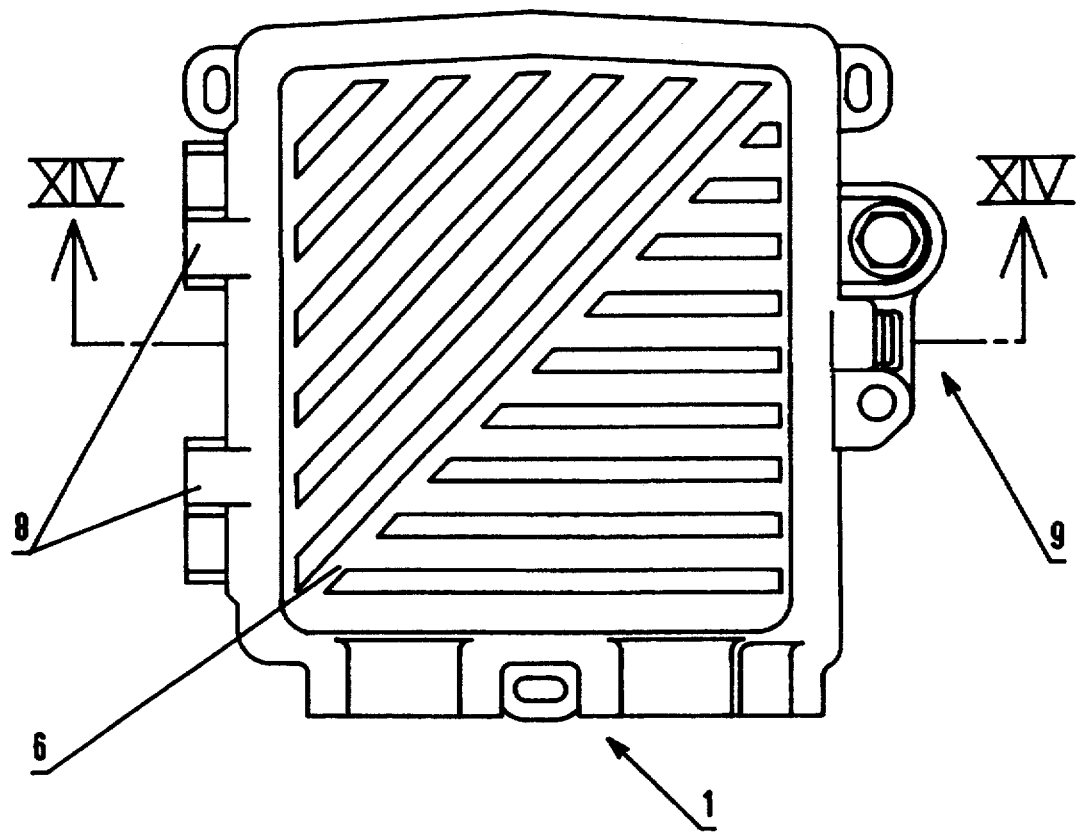
FIG. 13 shows this box according to FIG. 12 in the same way, with this same principal cover closed.

In the majority of the embodiments which have just been described, for example in that of FIG. 13, it is ascertained that it is an embodiment which is set on the Distributor side: the terminal is provided to receive either one or two lines (FIG. 15), or solely one line and not two (FIG. 17).

Finally, if it is desired to be able to connect either one or two incoming lines on the Distributor side, as is the case, for example, for the embodiment of FIG. 15, it is ascertained that the compartment 5, on the Distributor side, is equipped with elements which are overabundant in the case of only one incoming line being, in fact, connected on the Distributor side, which is then connected only to one single outgoing line, on the Subscriber side. In fact, if, in the embodiment of FIG. 15, it is desired to connect only the incoming line which corresponds to wires 10 and 11, the client nonetheless buys an interconnection terminal which is equipped, on the Distributor side, with all the elements (module 26, sockets for connection of the associated modules 35 and 36, cut-out circuit making the electrical connections), relative to the connection of a second line which he does not need. Nonetheless, it is generally desirable to be able subsequently to connect a second line on this terminal.

This results in a prejudicial economical loss which would be desirable to avoid in order to increase the competitiveness of this telephone interconnection terminal.

Another slight drawback of the devices with flap 65 for closure of the modular jack test socket on the Subscriber side, lies in the fact that, when this flap has been opened to disengage this socket, which brings about, ipso facto, disconnection of the line on the Subscriber side, it is then necessary to maintain this flap open with the finger, which virtually mobilizes the manipulator's hand. In fact, these flaps are equipped with a spring 66 for elastic return into position of closure, but not with a system for blocking in open position.

A last variant embodiment which overcomes these two drawbacks of the devices described hereinbefore will now be described with reference to FIGS. 22 to 29.

Figure 22:
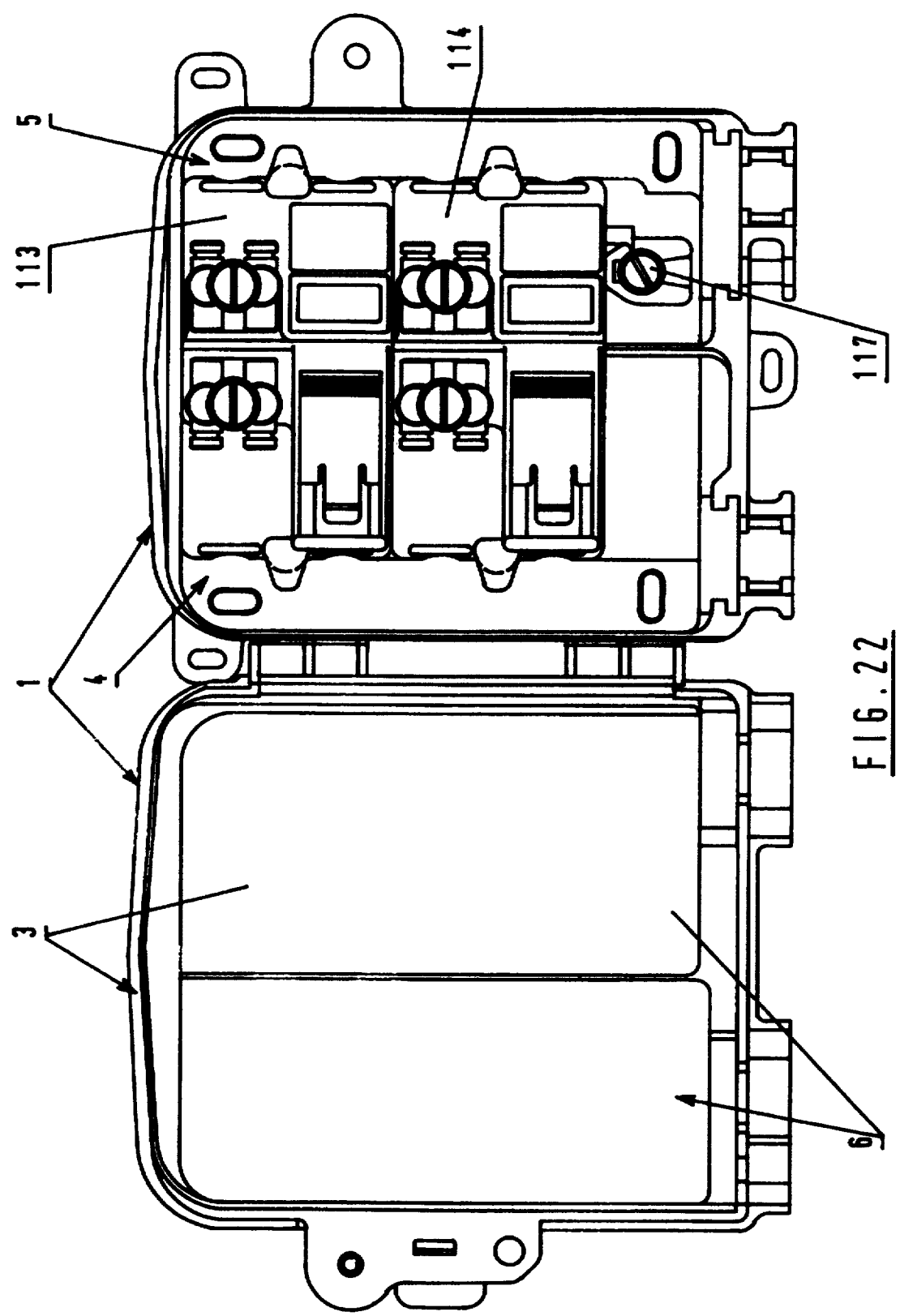
FIG. 22 is a view similar to FIG. 15, and illustrates a last variant embodiment of this interconnection terminal, wire connections according to FIG. 15 not being shown.

FIG. 22 is a plan view of this latter variant, the two covers closing the box being open, as in the case for the embodiment shown in FIG. 15 with which this FIG. 22 should be compared. This interconnection terminal is in this case equipped, in compartment 5 on the Distributor side and in compartment 4 on the Subscriber side, with all the elements and modules relative to two distinct incoming lines, connected by cut-out circuits, as hereinbefore, to two respective outgoing lines towards two distinct subscriber lines. It will be seen hereinafter that this terminal may also be equipped, and this is its principal advantage, solely with the elements and modules relative to one incoming line only, connected to one corresponding outgoing line towards the subscriber.

In this FIG. 22, the wire connections 10 to 14; 16 to 21 and 22 or 23, of FIG. 15 are not shown in order to render the drawing clearer.

Up to the present time, everything was based on the idea that the two compartments 5 and 4 had to be dealt with distinctly, precisely because they are two compartments. Each of these two compartments was therefore equipped distinctly as a function of the elements that it had to receive, which led to the first drawback which has just been mentioned. In the example of FIG. 15, for example, a set horizontal embodiment is thus attained which comprises, to the right, all the connections relative to compartment 5 and, to the left, all the connections relative to compartment 4, these two connections being located on either side of a separating partition, real or virtual, and being designed as totally separate from one another, apart from the local interconnection cut-out circuits, of course.

The embodiment according to FIGS. 22 to 29 disregards the prejudice whereby two distinct compartments, here compartments 5 and 4, must be dealt with distinctly. Therefore, instead of providing two compartments 5 and 4 which are separate from all points of view, it is provided to constitute them by means of at least two plug-in modules which each comprise a half-compartment 5A relative to an incoming line and a half-compartment 4A relative to an outgoing line, and which are adapted to fit in a receiving box bottom 2 of the box 1, which box bottom is at the start virtually empty of connections apart, possibly, from the earth connections, one against the other in order thus to be able, if necessary, to recreate the two complete compartments 5 and 4.

Each of these half-compartments comprises the complete connections relative to an incoming line and an outgoing line associated therewith. If one is interested only in one incoming and outgoing line, it then suffices to fit in this virtually empty receiving box only one of these modules. The other half of the box then remains empty and therefore does not comprise unused elements, as before.

On the contrary, by fitting the other module against the first, two complete compartments 4, 5 are obtained, as is the case in FIG. 15, with all the connections relative to two incoming lines respectively connected to two outgoing lines.

Figure 23:
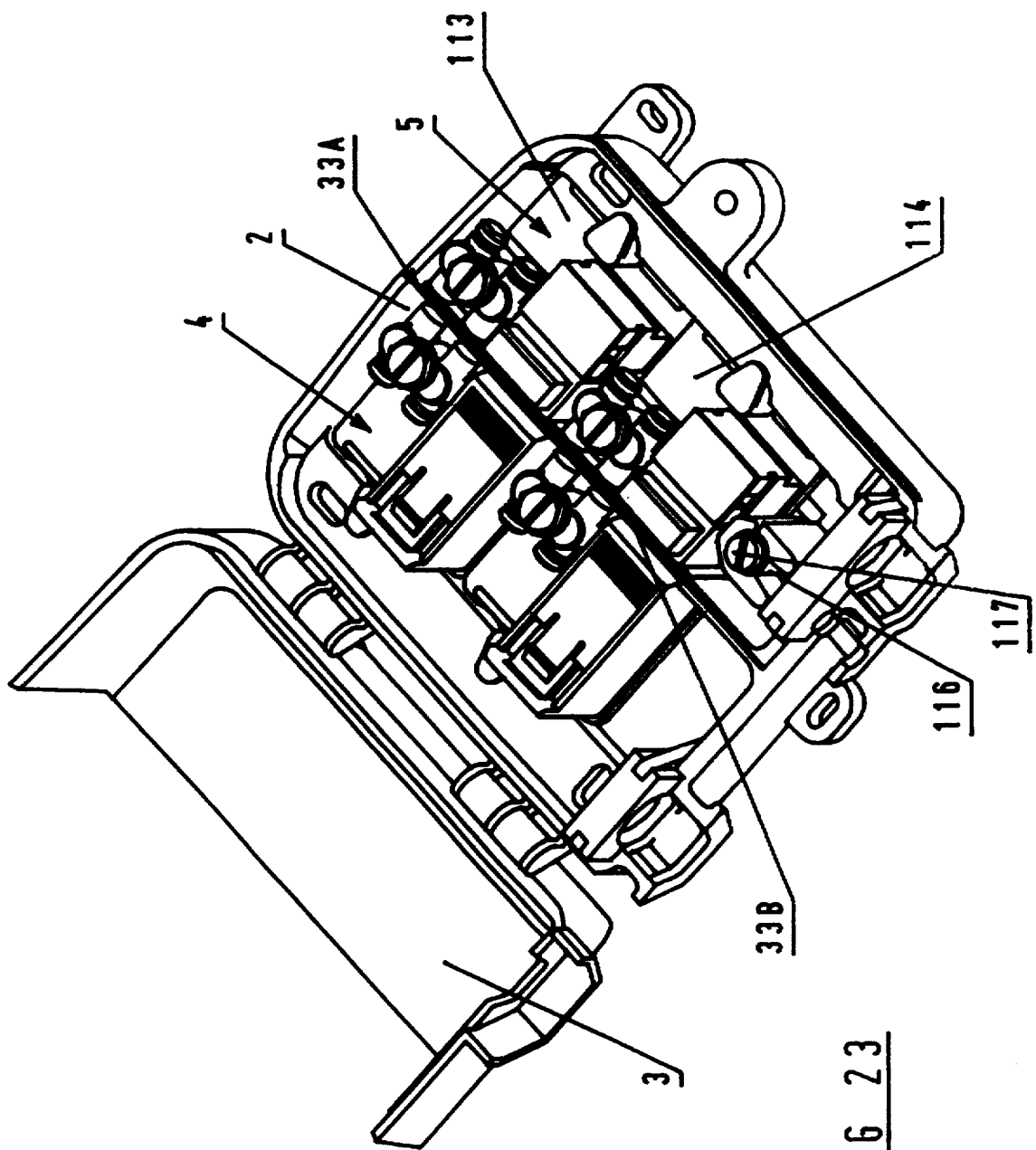
FIG. 23 is a partial view in perspective of the interconnection terminal of FIG. 22.
Figure 24:
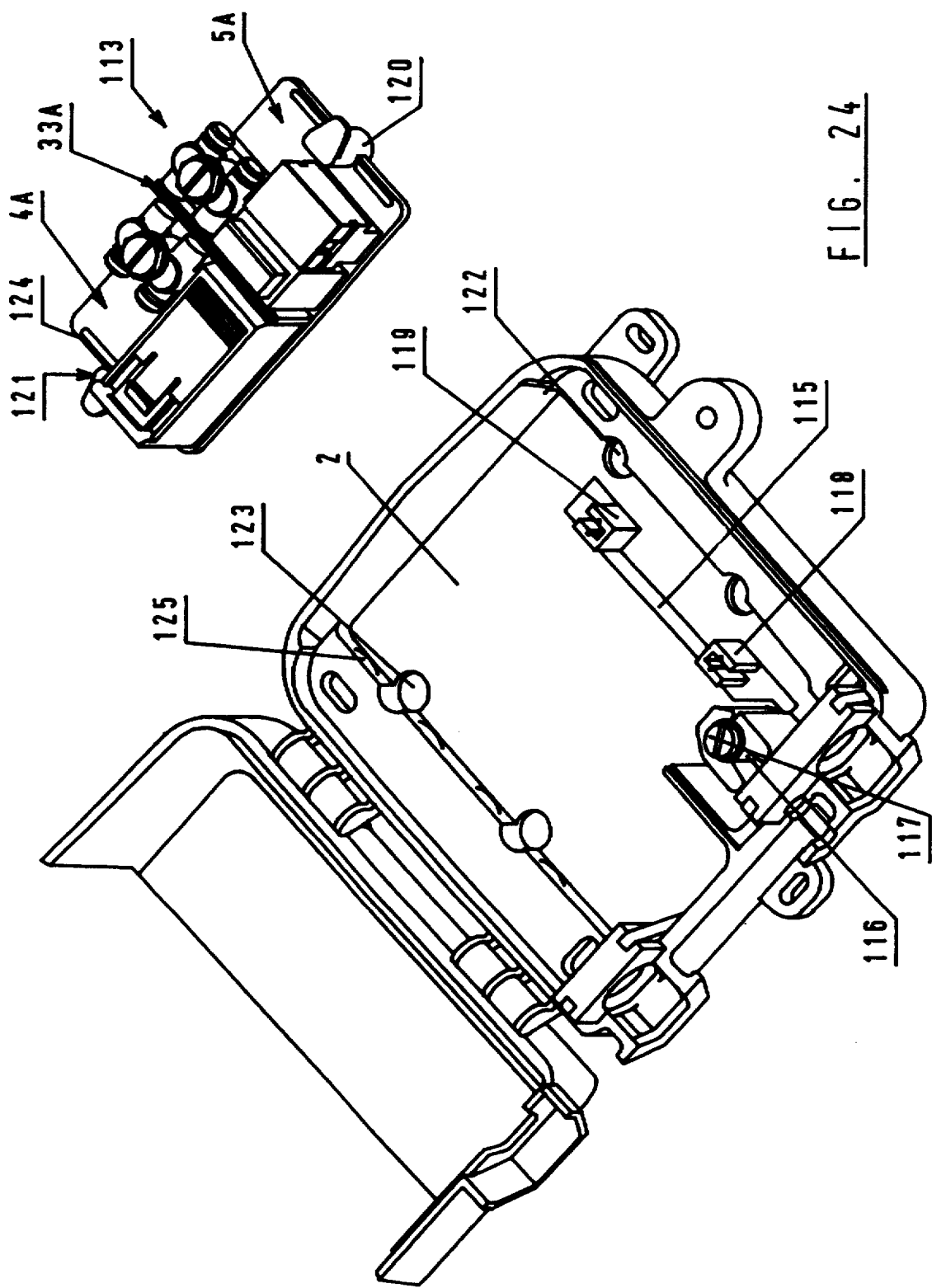
FIG. 24 is a view similar to FIG. 23, with the interconnection box emptied of its two plug-in modules, one of these modules shown above this box.

By attentively observing FIGS. 22 to 24, it is ascertained that the embodiment is horizontal, contrary to the embodiment of FIG. 15 which is vertical.

As clearly shown in FIG. 24, that portion of insulating box 2 which forms the bottom of the box of this terminal is, before it receives either one or two plug-in modules such as module 113 (FIG. 24) and/or the identical module 114 (FIGS. 22 and 23), virtually empty. In fact, it contains, as connection element, only a metal band 115 in cut-out circuit, which constitutes the earth connection and which is connected on the one hand to a terminal 116 adapted to receive from the outside an earth wire and connect this wire by means of a metal locking screw 117 and, on the other hand, to the median parts 118 and 119 for earth connection of two three-pin female sockets for connection by fitting two protective modules such as modules 36, 87 of the preceding embodiments. Such a three-pin socket may be seen, under reference 88, in FIG. 9 and the same socket is a little more visible in FIG. 10.

According to the invention, this virtually empty, insulating box bottom 2 is designed to receive, as desired, either one or two plug-in modules 113 and/or 114. To that end, two centering studs 120, 121 are provided on each plug-in module to cooperate with two respective corresponding receiving cavities 122 and 123 in box 2. Small supple plates 124 are further provided on each module to cooperate, by clipping, with corresponding convex parts 125 of the box bottom 2.

Figure 27:
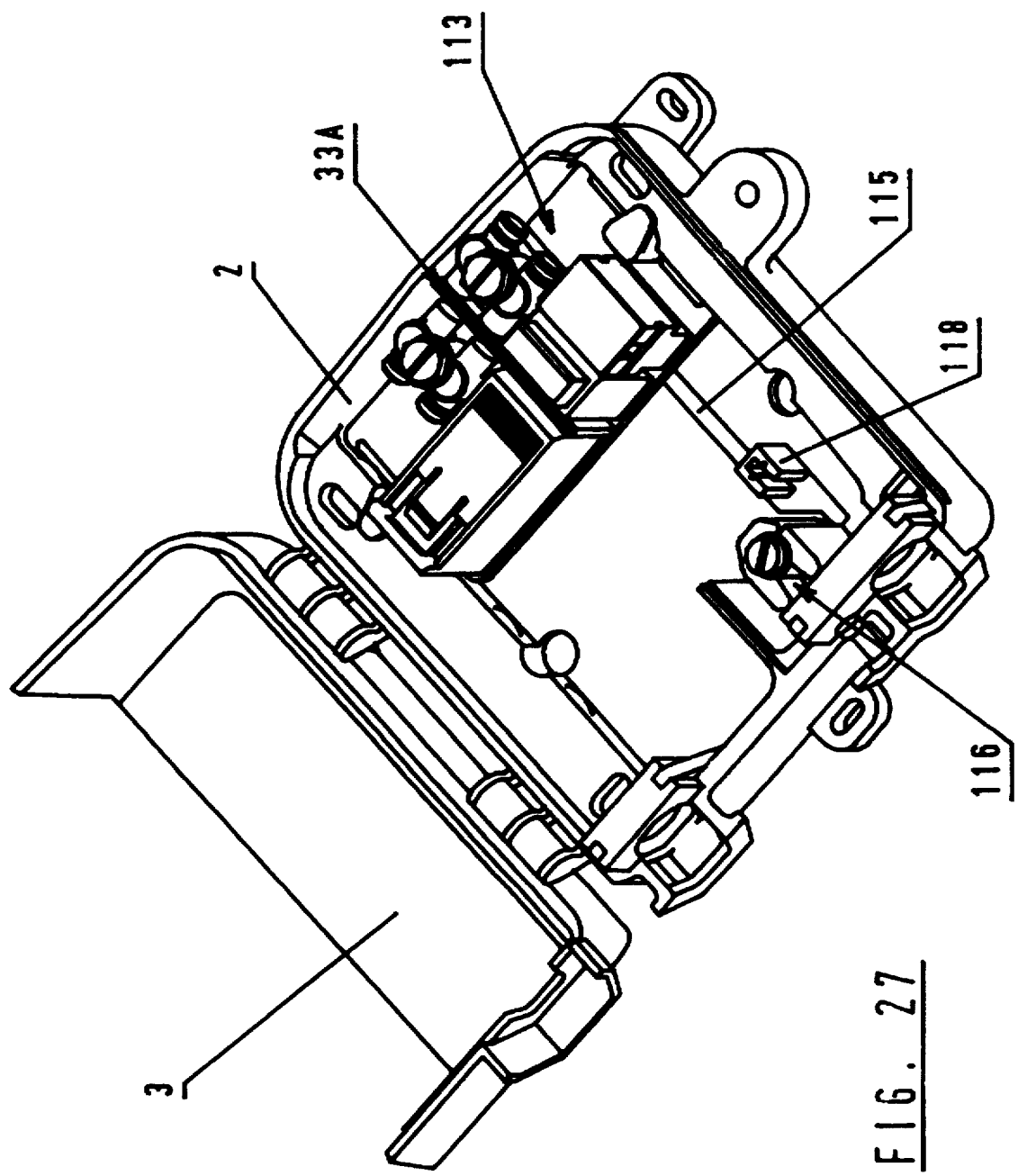
FIG. 27 is a view similar to FIG. 24, with said plug-in module placed in position in the box.

FIG. 27 shows the box bottom 2 after the module 113 has been plugged in and positioned, whilst FIG. 23 shows this same box bottom 2 after module 114 has been plugged in and positioned.

Apart from the earth connections 116, 117, 115, 118, 119 mentioned above which form part of the box bottom 2, all the connections relative to one incoming and outgoing line only is contained in module 113 for a first line and in module 114 for a second line. A partition 33A physically separates, in module 113 for example, compartment, or rathermore "half-compartment" 5A which contains the incoming connections of the Distributor, from compartment or "half-compartment" 4A which contains the outgoing connections towards the Subscriber.

Module 114 similarly comprises an identical partition 33B and, after plugging-in of the two modules 113 and 114 according to FIG. 23, these two half-partitions 33A and 33B are aligned to constitute a complete separating partition such as partition 33 of FIG. 1, between the two compartments 4 and 5, in that case complete.

Figure 25:
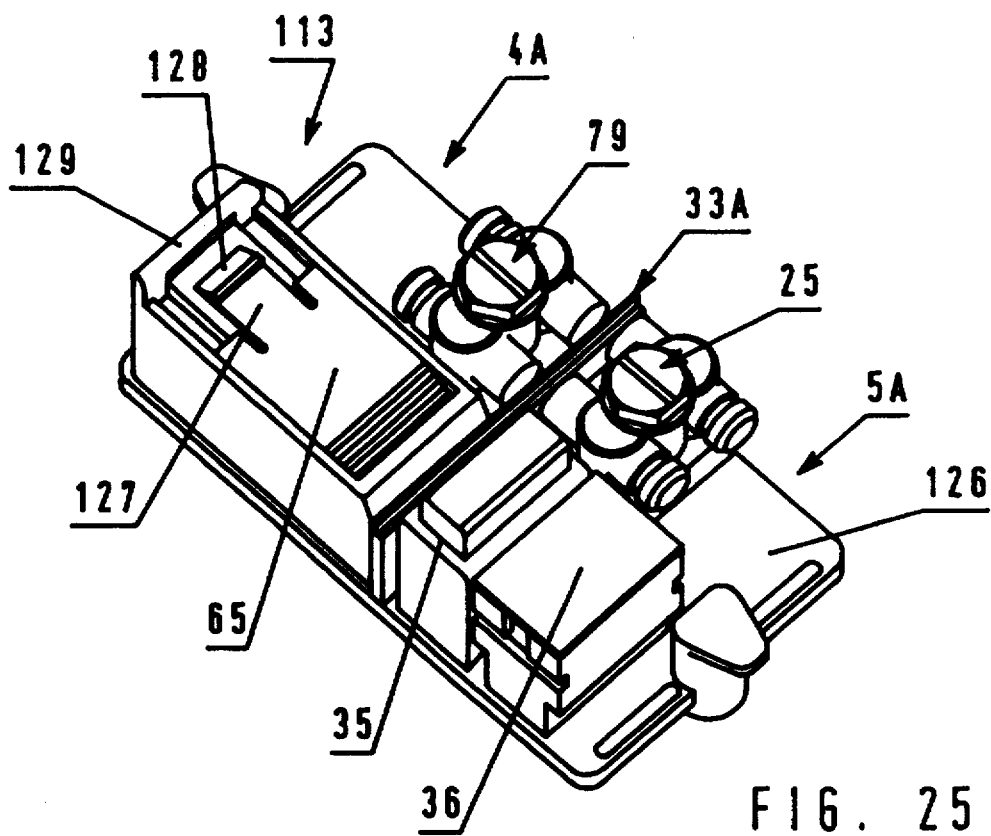
FIGS. 25 and 26 are views in perspective of the plug-in module of FIG. 24, the sliding flap which covers its female test socket, here of the "modular jack" type, being respectively in position of closure (FIG. 25) and in position of opening (FIG. 26).
Figure 26:
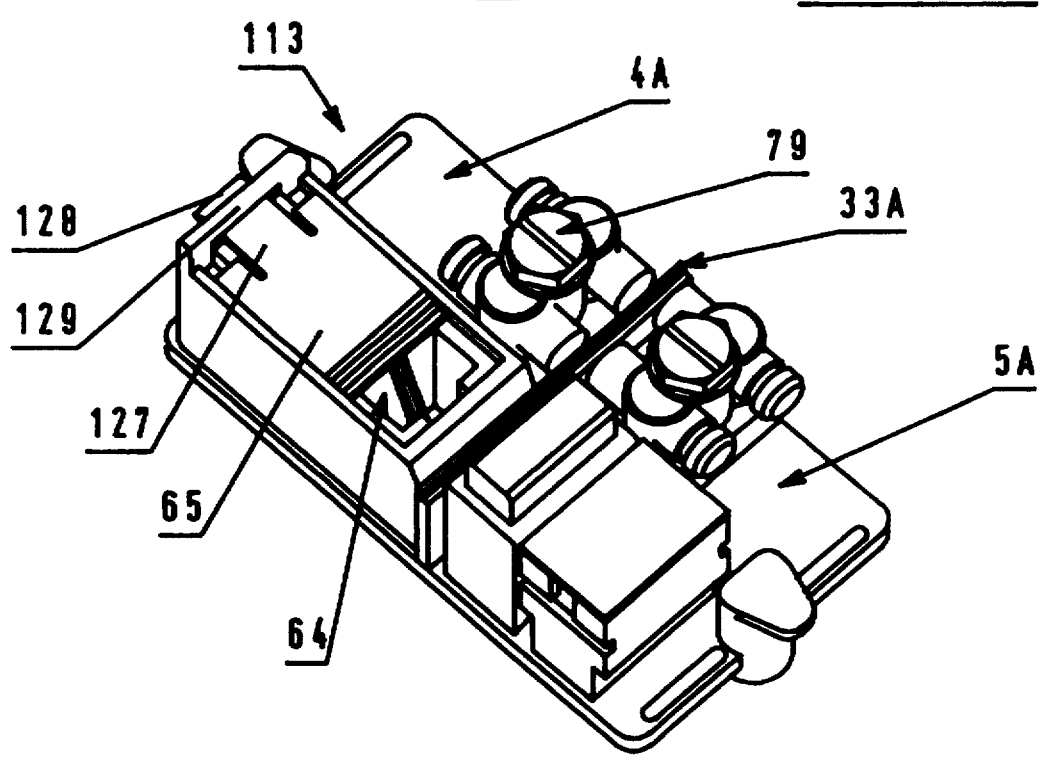

One of the two plug-in modules, for example module 113, is shown enlarged in FIGS. 25 and 26 respectively with its sliding flap 65 for closure of its test socket 64, here of the modular jack type, on the Subscriber side, on the one hand closed (FIG. 25) and, on the other hand, open (FIG. 26). It should be recalled on this subject that, in accordance, for example, with the embodiment of FIGS. 1 to 7, 12, 15 and 17, this flap 65 is a flap which is returned elastically into position of closure by a spring 66 and whose opening brings about, ipso facto, disconnection of the corresponding line on the Subscriber side.

In addition to the test socket 64 and its closure flap 65, compartment 4A on the Subscriber side comprises a conventional module 79 for rapid connection of the two outgoing wires towards the Subscriber (to be compared with FIG. 15).

Compartment 5A on the Distributor side comprises (to be compared with FIG. 15), a conventional module 25 for rapid connection of the two incoming wires coming from the Distributor, as well as, on the one hand, the socket for receiving a possible R-C module and, on the other hand, the other two female sockets which constitute, with the said female earth socket 119 which is already in place in the box bottom 2 (cf. FIG. 24), the female socket for receiving a possible protecting module 36.

In module 113, all the interconnections are made, as in the majority of the preceding embodiments, by means of a cut-out circuit (not shown) which is incrusted beneath the plate 126 of the module 113.

The sliding flap 65 is provided with a semi-rigid tab 127 in overhang and whose free end is equipped with a clipping hook 128.

When, as shown in FIG. 26, the flap 65 is opened completely to disengage the modular jack socket 64, the semi-rigid tab 127 passes beneath a corresponding crosspiece 129 of the body of the module 113, with the result that, at the end of the opening stroke of this flap, hook 128 clips behind this crosspiece 129, thus maintaining the flap 65 in open position, against the force of its elastic return device 66.

In order to close flap 65 again, it then suffices to press hook 128 downwardly, in order thus to disengage it from its retaining crosspiece 129 and release the return spring 66 from this flap.

Figure 28:
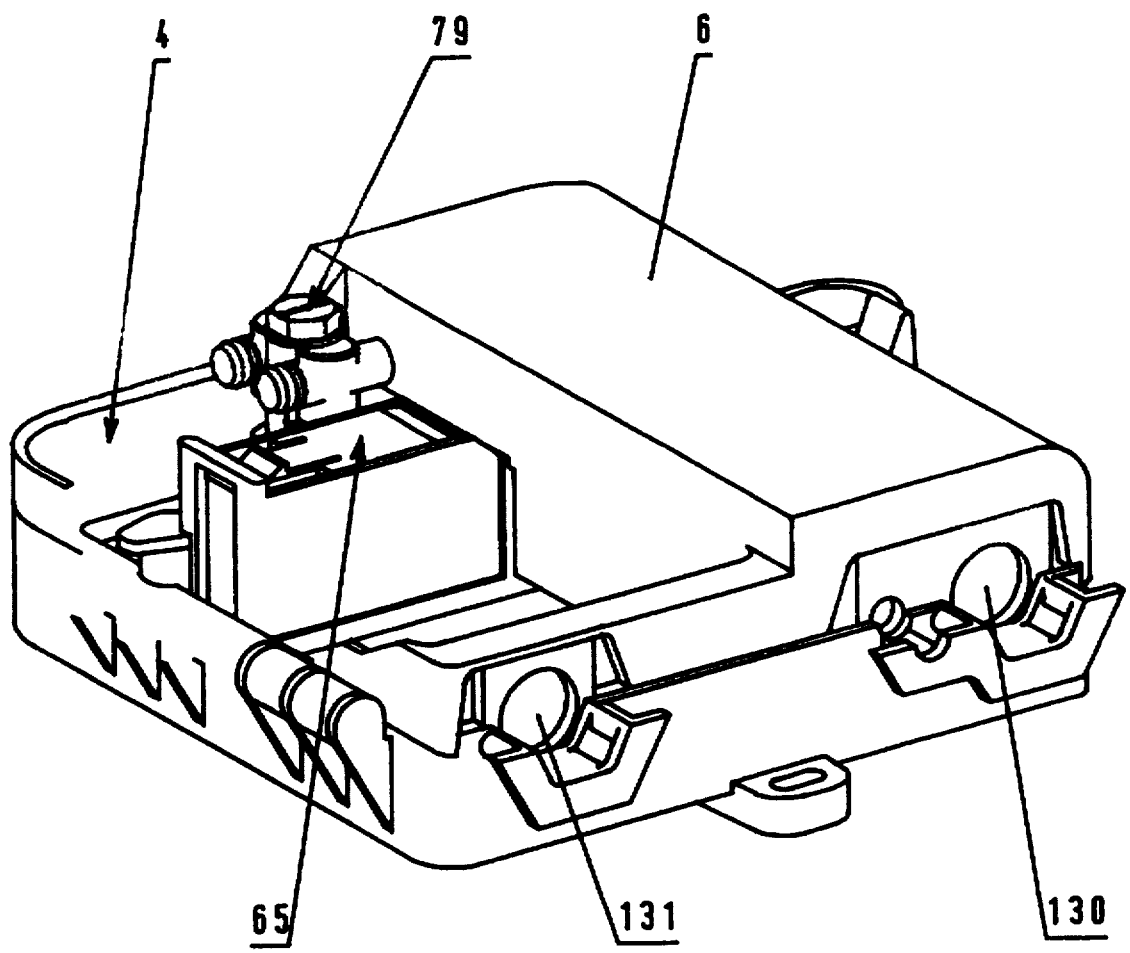
FIG. 28 is a partial view in perspective which shows the interface according to FIG. 27, with only the first cover, relative to the distributor side, closed, only the part on the subscriber side remaining visible and therefore accessible.

FIG. 28 shows how, by closing solely the lower half-cover 6 (compare with FIG. 3), only compartment 4 on the Subscriber side remains accessible (the outer cover 3 is not shown in this FIG. 28). FIG. 28 clearly shows the two passages 130 and 131 through which the wire connections, on the Distributor side and Subscriber side, respectively, will pass.

Finally, FIG. 29 is a plan view similar to FIG. 22, but with only module 113 in place in the box bottom 2 and the three wire connections. 22 (earth), 10 and 11 (line) on the Distributor side placed in position and connected and the two wire line connections 16 and 17 on the Subscriber side placed in position and connected (compare with FIG. 15).

It goes without saying that the invention is in no way limited to the embodiments which have just been described and other forms of embodiment, comprising the same two functions, of this terminal device may be envisaged. Compartment 5 may, for example, receive functional plug-in modules other than the protecting module 36 and the R-C module 35.

What is claimed is:

1. A terminal device, comprising:
   a box containing first and second compartments separated from each other by an insulating wall, said first compartment receiving an incoming distributor line, said second compartment receiving an incoming subscriber line which includes subscriber wires;
   non-wire electrical connectors extending between the compartments, provided to interconnect the incoming subscriber line received in the second compartment to the incoming distributor line received in the first compartment;
   a plug-in module plugged into said second compartment, said plug-in module including a module body, interconnection means connected to the module body and being accessible from an outside of the module body for receiving the subscriber wires of the incoming subscriber line, a telephone test socket electrically connected to said non-wire electrical connectors for direct access to the distributor line, and a mechanical switch for automatically cutting-off the subscriber line from the distributor line when a telephone plug is received in said telephone test socket.

2. The terminal device of claim 1, wherein the mechanical switch includes a flap which covers the telephone test socket, whereupon translation of the flap to uncover the telephone test socket disconnects the subscriber line from the distributor line.

3. The terminal device of claim 1, wherein said interconnection means comprises a rapid interconnection module.

4. The terminal device of claim 1, wherein the mechanical switch includes two elastic electrical connectors to connect the subscriber line to the non-wire connectors, the two elastic electrical connectors being separated from the non-wire connectors to disconnect the subscriber line from the non-wire connectors.

5. The terminal device of claim 4, wherein the interconnection means comprises a rapid interconnection module including two metal contacts, each having an upper self-stripping slit and a lower slit, the lower slits respectively receiving the two elastic electrical connectors.

6. The terminal device of claim 1, further comprising a rapid interconnection module receiving the distributor line in said first compartment.

7. The terminal device of claim 6, wherein the rapid interconnection module includes two metal contacts, each having an upper self-stripping slit and a lower slit, said lower slit receiving a non-wire connector.

8. The terminal device of claim 1, further comprising at least one auxiliary module provided in the first compartment and connected to the non-wire connectors, said at least one auxiliary module including at least one of a protection module having an overvoltage arrestor, and an R-C module.

9. The terminal device of claim 1, wherein said telephone test socket of said plug-in module is one of a telephone contact and a modular-jack socket.

10. The terminal device of claim 1, wherein said first and second compartments are formed by a global plug-in module plugged into the box, said global plug-in module being divided into said first and second compartments.

11. The terminal device of claim 10, wherein a plurality of global plug-in modules are provided side-by-side in the box, for interconnection of a plurality of subscriber and distributor lines.

12. The terminal device of claim 2, wherein said mechanical switch further comprises retaining means for retaining said flap in an open position to access the telephone test socket.

13. The terminal device of claim 12, wherein said retaining means comprises a semi-rigid tab extending from the flap, said semi-rigid tab having a clipping hook adapted to clip to a conjugate clipping member to hold the flap in the open position.

14. The terminal device of claim 1, wherein said first and second compartments receive a plurality of distributor and subscriber lines, respectively, and said second compartment contains a plurality of plug-in modules for the plurality of subscriber lines.

15. The terminal device of claim 1, wherein said non-wire electrical connectors comprise metal blades.

16. The terminal device of claim 1, wherein a base is provided in the box, the base extending between the first and second compartments, said plug-in module being plugged onto the base.

17. The terminal device of claim 3, wherein said rapid interconnection module includes two metal contacts each having an upper self-stripping slit, each upper self-stripping slit respectively receiving a subscriber wire of the subscriber line, said rapid interconnection module further including a control screw to effect self-stripping of the subscriber wires.

18. The terminal device of claim 4, wherein the mechanical switch further comprises a flap covering the telephone test socket, wherein the flap abuts the two elastic electrical connectors to disconnect the subscriber line from the non-wire connectors upon translation of the flap expose the telephone test socket.

* * * * *